United States Patent
Wissmann et al.

(10) Patent No.: US 12,433,724 B2
(45) Date of Patent: Oct. 7, 2025

(54) METHOD AND INTRAORAL SCANNER FOR DETECTING THE TOPOGRAPHY OF THE SURFACE OF A TRANSLUCENT OBJECT, IN PARTICULAR A DENTAL OBJECT

(71) Applicant: INFINISENSE TECHNOLOGIES GMBH, Munich (DE)

(72) Inventors: Patrick Wissmann, Munich (DE); Nicolas Emanuel Ulrich, Munich (DE)

(73) Assignee: Infinisense Technologies GmbH, Munich (DE)

(*) Notice: Subject to any disclaimer, the term of this patent is extended or adjusted under 35 U.S.C. 154(b) by 315 days.

(21) Appl. No.: 18/209,199

(22) Filed: Jun. 13, 2023

(65) Prior Publication Data
US 2023/0320825 A1   Oct. 12, 2023

Related U.S. Application Data

(63) Continuation of application No. PCT/EP2021/084571, filed on Dec. 7, 2021.

(51) Int. Cl.
*A61C 9/00*   (2006.01)
*G01B 11/25*   (2006.01)
*G02B 27/42*   (2006.01)

(52) U.S. Cl.
CPC .......... *A61C 9/006* (2013.01); *G01B 11/2513* (2013.01); *G02B 27/4227* (2013.01)

(58) Field of Classification Search
CPC ..... H04N 23/698; H04N 5/2628; H04N 7/183
See application file for complete search history.

(56) References Cited

U.S. PATENT DOCUMENTS

2012/0092461 A1* 4/2012 Fisker ................ G01B 11/2518
   348/46
2016/0064898 A1* 3/2016 Atiya ...................... H01S 5/183
   356/601

(Continued)

FOREIGN PATENT DOCUMENTS

DE   102007054907 A1   5/2009
DE   102014212231 A1   12/2015

(Continued)

OTHER PUBLICATIONS

International Search Report issued by the European Patent Office for International Patent Application No. PCT/EP2021/084571, mailed Mar. 25, 2022.

(Continued)

*Primary Examiner* — Thai Q Tran
*Assistant Examiner* — Jose M Mesa
(74) *Attorney, Agent, or Firm* — Myers Wolin, LLC

(57) ABSTRACT

A method and intraoral scanner are provided for detecting topography of the surface by at least partly superimposing a first and a second sub-topography. Each sub-topography is detected by projecting a total measurement pattern onto a respective sub-region of the surface by a projection device. The total measurement pattern has at least two different measurement patterns, each of which has parallel measurement lines, and each of the measurement patterns is assigned to a diffractive optical element, by means of which measurement lines can be generated by light diffraction. The method then provides a first and a second image of each sub-region, a first measurement pattern being projected onto the sub-region of the surface in the first image and a second measurement pattern being projected onto the sub-region of the surface in the second image, and detects the sub-topographies by triangulation in each case.

19 Claims, 12 Drawing Sheets

(56) References Cited

U.S. PATENT DOCUMENTS

| | | |
|---|---|---|
| 2019/0213753 A1 | 7/2019 | Fu et al. |
| 2019/0231492 A1* | 8/2019 | Sabina .................... G06T 19/00 |
| 2019/0269485 A1* | 9/2019 | Elbaz ................... A61B 5/1079 |
| 2019/0388193 A1 | 12/2019 | Saphier et al. |
| 2023/0263397 A1* | 8/2023 | Van Der Poel ...... A61B 5/0077 |
| | | 433/29 |

FOREIGN PATENT DOCUMENTS

| | | |
|---|---|---|
| DE | 102015205187 A1 | 9/2016 |
| JP | 2019 164325 A | 9/2019 |
| WO | 2018 073824 A1 | 4/2018 |
| WO | 2019 032923 A2 | 2/2019 |
| WO | 2020 102658 A2 | 5/2020 |

OTHER PUBLICATIONS

Prygun et al., "Experimental research of speckle suppression efficiency in the entire visible specrum using moving BD composite diffraction grating" J Opt (2018), published online Oct. 27, 2017; url: http://doi.org/10.1007/s12596-017-0437-7; pp. 220-228; vol. 47, No. 2, Optical Society of India; Springer.

* cited by examiner

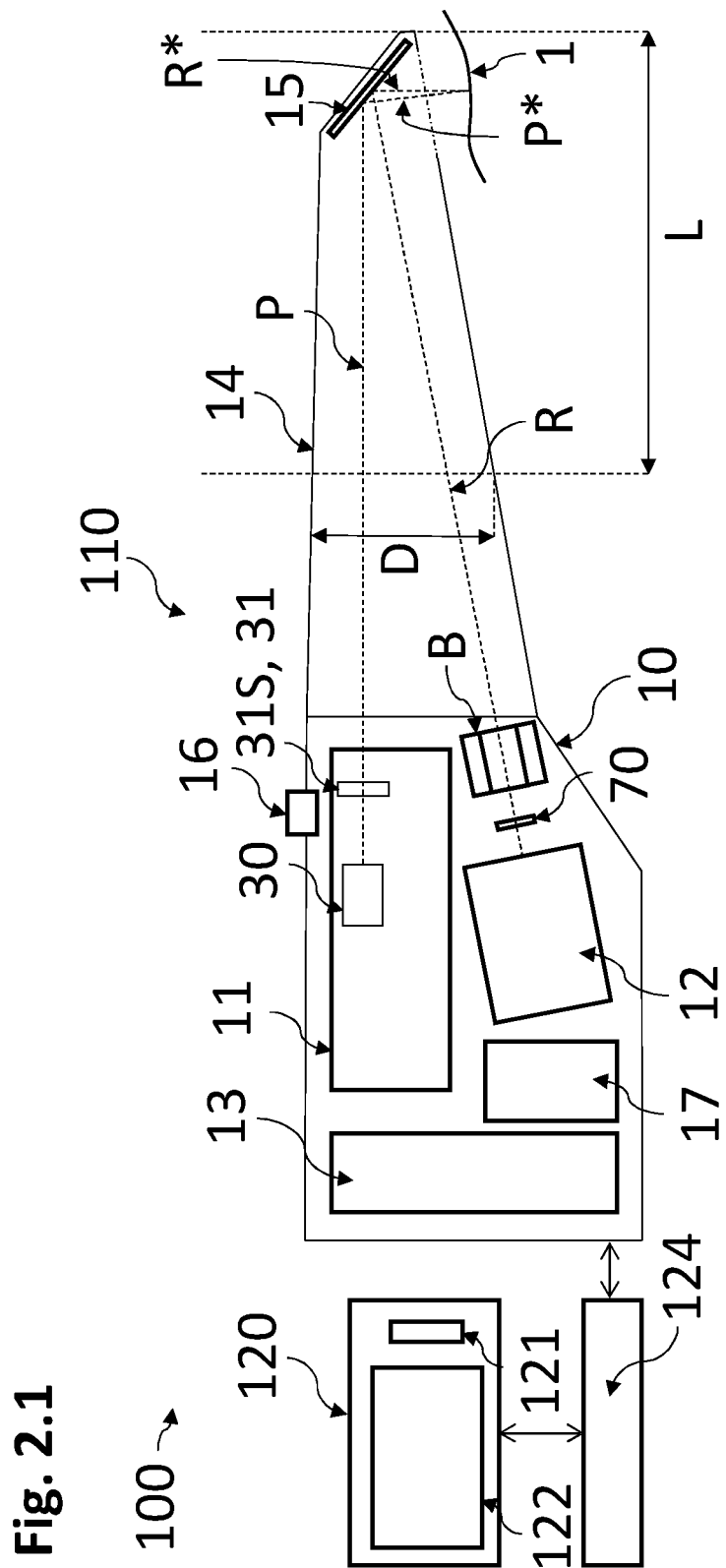
Fig. 2.1

Fig. 2.2
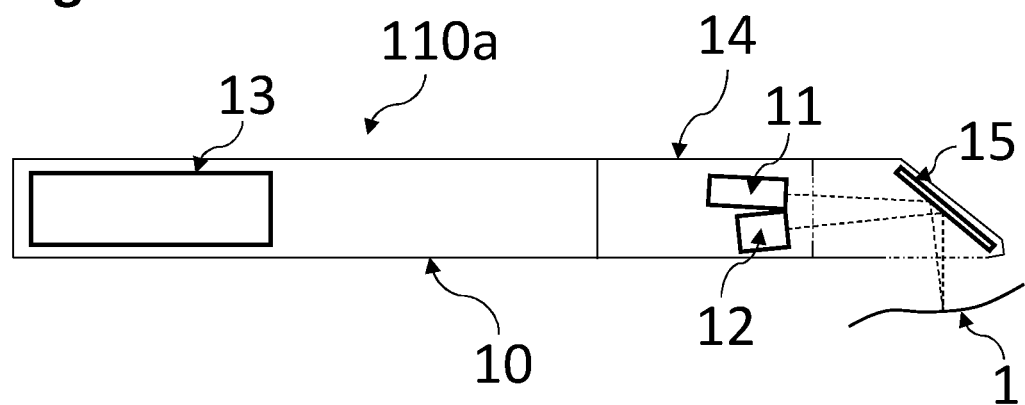
Fig. 2.3
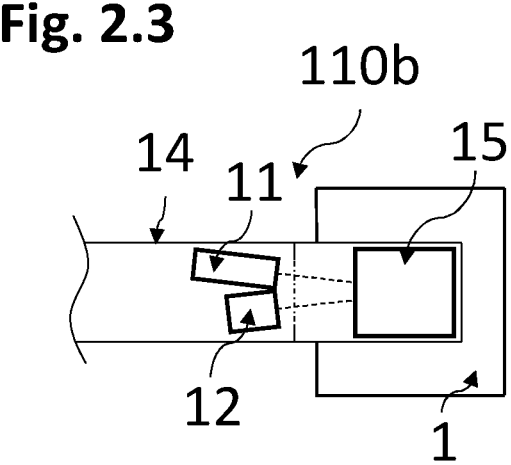

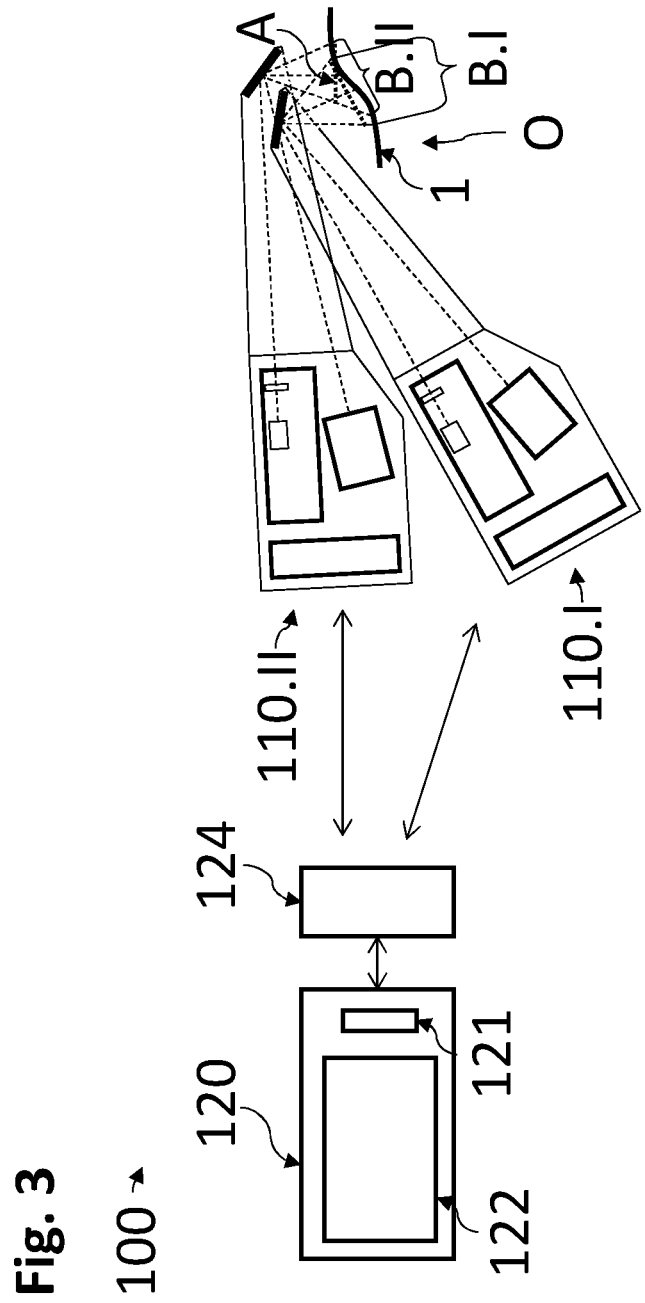

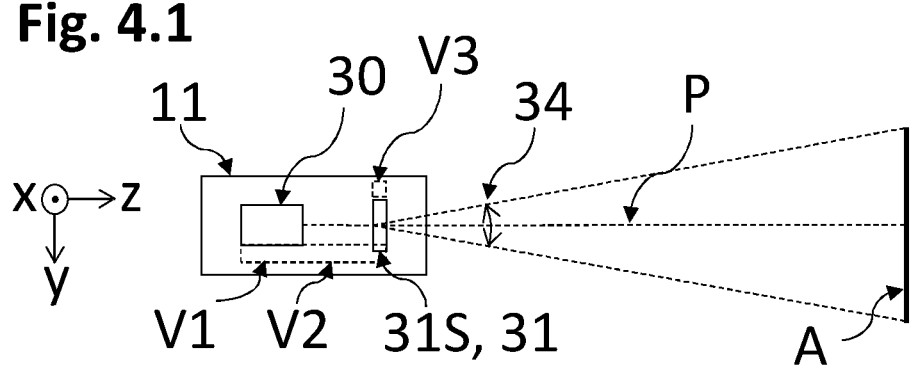
Fig. 4.1
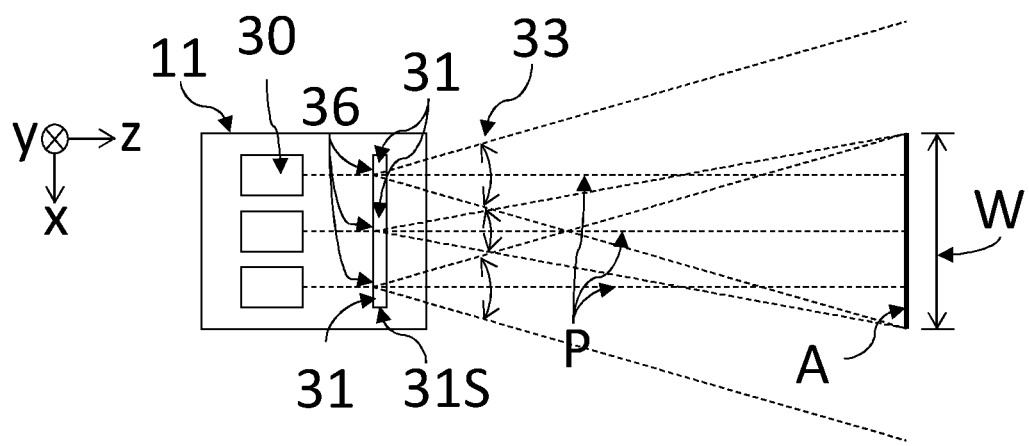
Fig. 4.2

Fig. 4.3
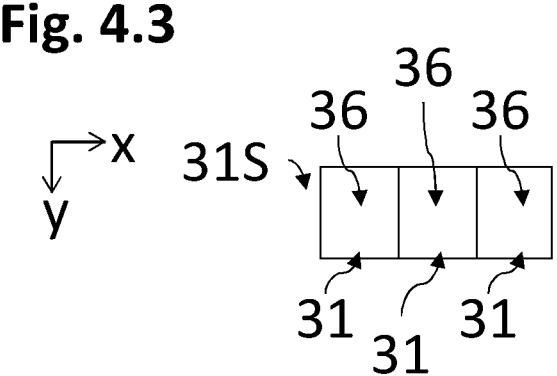
Fig. 4.4
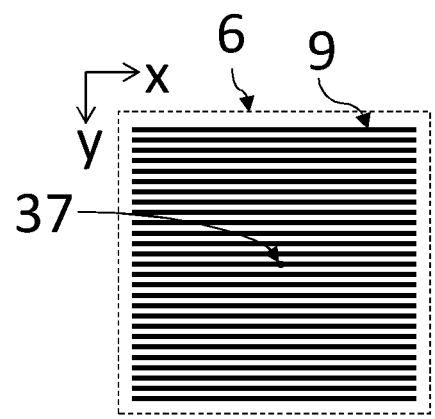

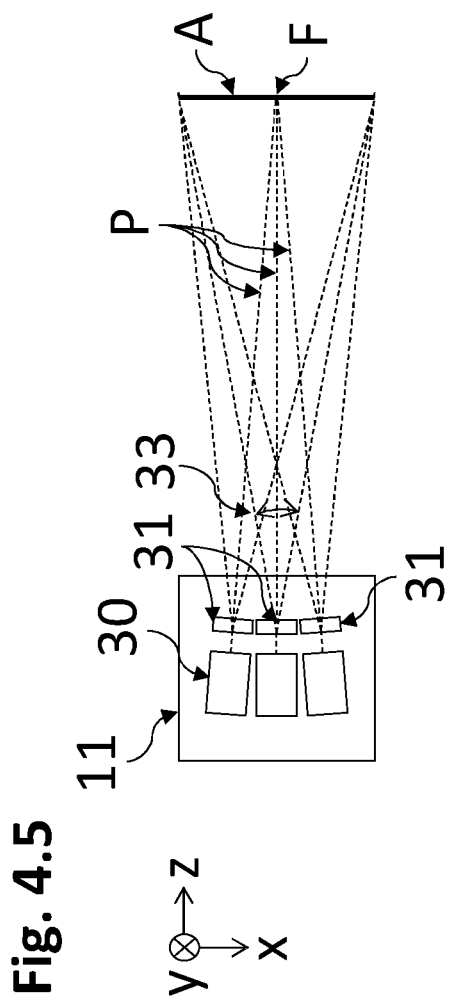
Fig. 4.5

Fig. 5.1
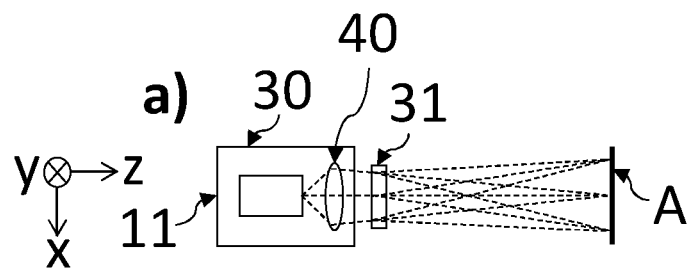
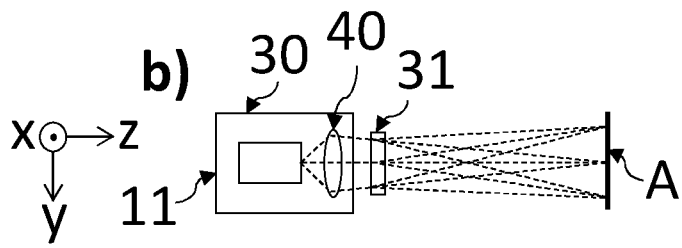

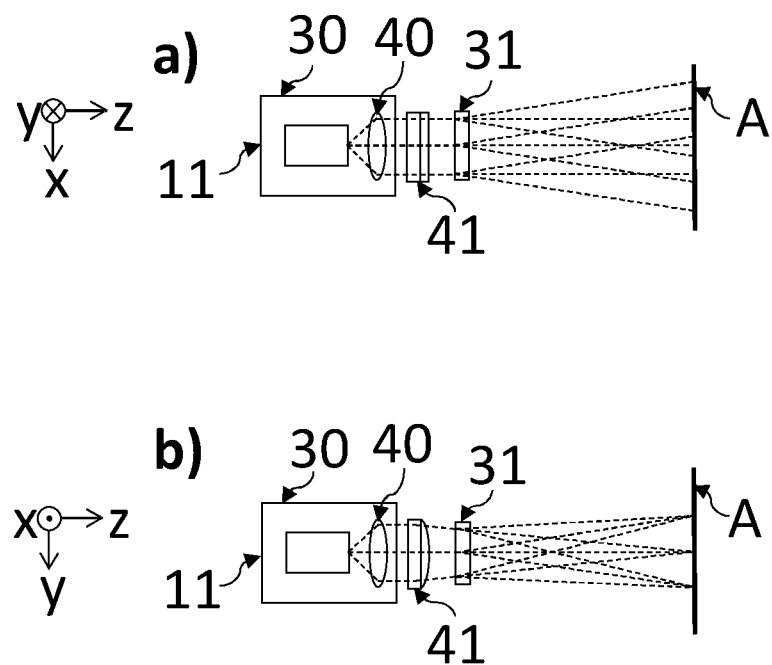
Fig. 5.2

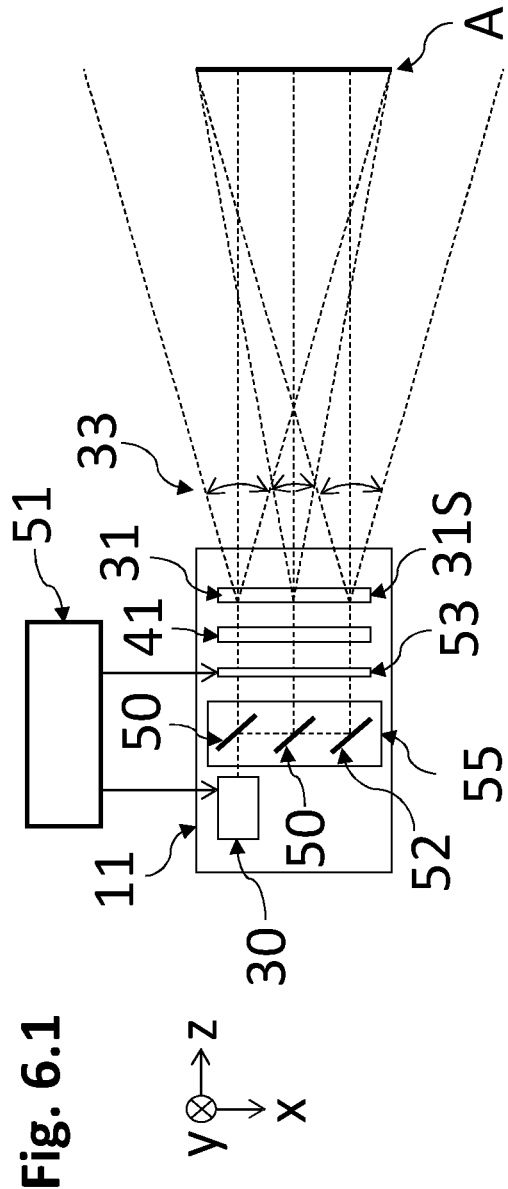
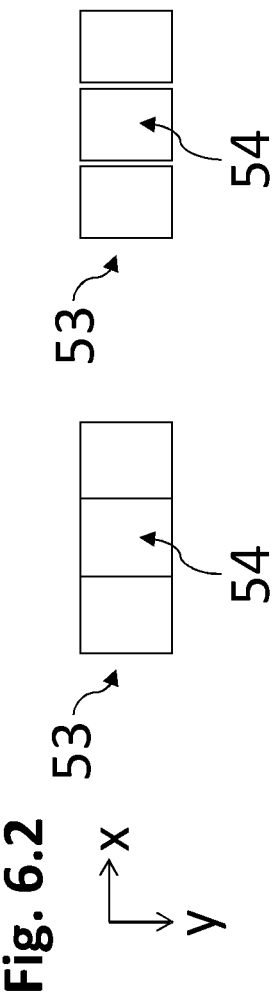
Fig. 6.1
Fig. 6.2

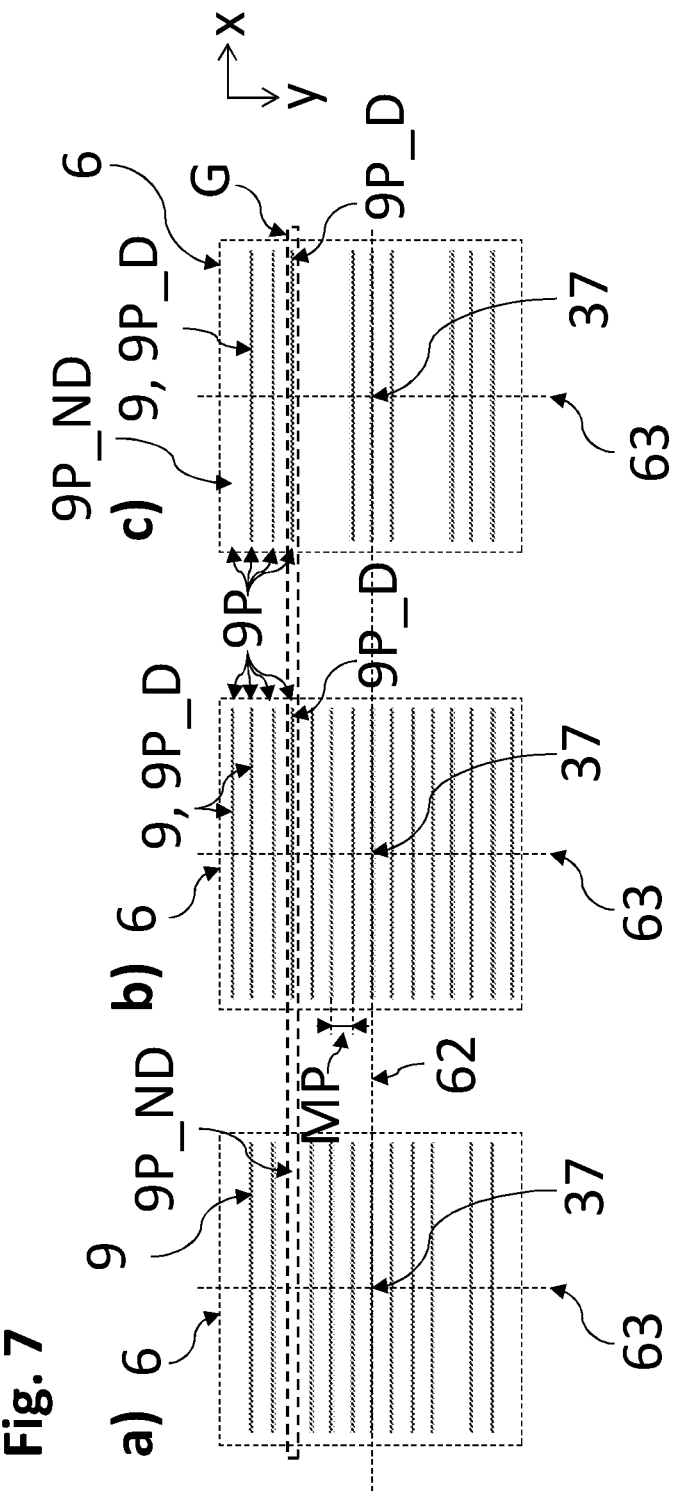

METHOD AND INTRAORAL SCANNER FOR DETECTING THE TOPOGRAPHY OF THE SURFACE OF A TRANSLUCENT OBJECT, IN PARTICULAR A DENTAL OBJECT

CROSS REFERENCE TO RELATED APPLICATIONS

This application is a continuation under 35 U.S.C. § 120 of International Application PCT/EP2021/084571, filed Dec. 7, 2021, which claims priority to German Application No. 10 2020 133 627.6, filed Dec. 15, 2020, the contents of each of which are incorporated by reference herein.

FIELD OF THE INVENTION

The invention relates to a method and an intraoral scanner for recording the topography of the surface of a translucent, in particular dental object.

BACKGROUND

Methods and intraoral scanners for recording the topography of the surface of translucent objects, in particular dental objects are known from the state of the art and are used in particular in the field of dentistry in order to record the dental condition of a patient three-dimensionally (3D recording) and digitally. Recording is typically carried out by means of an intraoral scanner (also called 3D intraoral camera or 3D intraoral scanner), which includes a so-called "hand piece" with a recording system.

During the process of recording the topography (also generally called scanning operation or intraoral scanning) an operator guides a so-called scan tip of the hand piece in the oral cavity of the patient across the region/the dental surface to be recorded. The dental surface, as a rule, is formed by dental objects such as teeth, gums, tooth restorations or dental aids such as for example so-called "scan bodies" or "abutments". The result of the scanning operation is a recorded topography of the recorded object (also called "digital (tooth) print" in the field of intraoral scanning).

The term topography in the field of metrology denotes the (geometric) shape of an object. A topography recorded in a metrological manner may for example be present as a plurality of three-dimensional measuring points (also called "point cloud"), a three-dimensional triangle net (mesh or triangle mesh) or one or more depth maps. A depth map is a digital image consisting of pixels, wherein the pixels represent "depth values". The depth values of a depth map correspond to respective distances of a local coordinate system (or generally a 3D camera/depth camera) from the surface of a recorded object, as seen from the respective recording position/direction of view.

Intraoral scanners can also be used outside oral cavities in order to record the topography of the surface of dental or other objects (e.g. a dental model or a component not related to dentistry).

During the scanning operation partial topographies of the currently recordable (or visible) partial surfaces are recorded in the form of three-dimensional data. This partial surface corresponds to a mostly small cut-out of the total surface to be recorded. In order to record the (total) topography of the total surface, a plurality of recorded partial topographies of partial surfaces are assembled while moving the scan tip (across the surface to be recorded), a process which is also termed "registration", "alignment", "stitching" or "SLAM" ("simultaneous localisation and imaging). The plurality of the partial topographies of the partial surfaces (partial areas of the surface) is thus assembled to form the (total) topography of the surface to be recorded, so that a three-dimensional recording of the total surface (region) to be recorded is created. Recording of the topography is thus carried out whilst the scan tip is moved (continually) at a certain movement speed (along a movement path) across the surface to be recorded. Practicability is enhanced if recording of the topography is moreover reliably achieved at relatively high movement speeds with relatively high total recording accuracy.

In particular in the field of dentistry it is typically necessary for the topography of the surface to be recorded at an accuracy of at least 50 µm (total recording accuracy). In order to achieve this total recording accuracy, it is typically necessary to record the individual partial topographies forming the (total) topography at an even higher accuracy (which may for example lie within a region of 5 to 10 µm) (partial recording accuracy), since recording accuracies of individual partial topographies may add up during the course of composing the (total) topography of the surface.

Various methods for recording the topography of a surface have been disclosed in the state of the art. The present disclosure refers to the known method of "structured illumination" in connection with the known method of triangulation, also jointly called "active triangulation".

With structured illumination one or more measuring patterns, each of which may typically include several measuring elements (e.g. measuring lines, point-shaped measuring elements), are projected in direction of a projection axis onto the surface of an object with the aid of a light source. This causes the surface of the object to be illuminated by the measuring pattern (or the measuring elements), so that merely the sections of the surface assigned to the measuring elements are illuminated by the light source at a high light intensity, whilst the areas of the surface lying between the illuminated sections are not (directly) illuminated by the light source and thus have a lesser light intensity. Accordingly the light intensity varies locally along the surface, wherefore this type of illumination of the surface is also called structured illumination.

An image of the measuring elements of the measuring pattern projected on the surface is recorded along a recording axis deviating from the projection axis by means of a recording system (e.g. a camera). The topography of the object surface causes a spatial distortion of the measuring pattern as viewed by the recording system. This distortion is utilised in terms of triangulation in order to record the topography of the object surface by means of geometric calculations, in that three-dimensional coordinates are determined for a plurality of measuring points lying on the measuring elements. Correct determination of the three-dimensional coordinates of the measuring points presumes that the so-called correspondence problem has been solved, according to which each individual measuring element must be individually identified in the recorded image of the recording system. In this context it is also mentioned that (individual) measuring elements are encoded or indexed thus allowing the correspondence problem to be solved. In the state of the art a plurality of methods for solving the correspondence problem are known, wherein the measuring elements are encoded for example by means of different colours (colour-coded measuring elements) and/or by a characteristic presence or absence of measuring elements in recorded images (presence-encoded measuring elements). In this context both temporal sequences (temporal encoding)

and spatial sequences (spatial encoding) as well as hybrid forms of both approaches are known (hybrid encoding).

With temporal encoding a measuring element is encoded via an image content characteristically changing in the course of one or more projections/recordings, for example a measuring line, which is characteristically present or absent in the recorded images in a sequence consisting of several projections/recordings. A purely temporal encoding is characterised in that each measuring element is encoded singly, i.e. an environment of measuring elements for solving the correspondence problem is not required. Detrimental here is the fact that one has to contend with a comparatively high number of projections/recordings.

With spatial encoding a measuring element is encoded via a characteristic image content present in the environment of the measuring element, for example the presence or absence of further (measuring) lines in the environment of the measuring element. Correspondingly the solution of the correspondence problem requires that an environment of measuring elements is recorded; direct resolution of a single measuring element is not possible. In this context there is also talk of a minimally resolvable sequence/environment of measuring elements, for example it may be necessary to record n adjacent measuring elements in order to solve the correspondence problem for these measuring elements. This disadvantage is countered by the advantage of a comparatively small number of projections/recordings.

Hybrid encoding corresponds to a combination of spatial and temporal encoding. Selecting an encoding approach (temporal, spatial or hybrid) crucially depends on the general conditions and targets of the respective application. For example, a hybrid encoding may represent a compromise consisting of a number of projections/recordings which is smaller than for a purely temporal encoding, and a minimally resolvable sequence/environment of measuring elements, which is smaller than for a purely spatial encoding.

Further the state of the art has disclosed the use of additional patterns or pattern sequences, which exclusively serve the solution of the correspondence problem, for example a Gray Code sequence consisting of stripe patterns.

In practice one or several different measuring patterns are projected. The measuring patterns may include one or more measuring lines (as measuring elements) or may be shaped entirely differently, e.g. in the form of point patterns or colour-coded stripe patterns.

The document WO 2018073824 A1 discloses a device and a method for recording intraoral scenes by means of structured illumination and triangulation. Recording is effected by means of a colour-coded, imaging measuring pattern projection onto the object to be recorded as well as by means of the capture of the projected measuring pattern by means of a camera. After detecting the colour transitions a 3D recording is realised corresponding to the known method of active triangulation.

The imagingly projected colour-coded measuring pattern may be generated using methods known in the state of the art with a white light source and corresponding colour filters, which e.g. are present in the form of a slide. This slide is mapped by a projection lens onto the object surface.

The document DE 102007054907 A1 also describes a method and an associated device for optically surveying dental objects using a triangulation method, wherein (at least) two different measuring patterns are projected and captured simultaneously. The measuring patterns are generated by shading in that light sources screen aperture means designed as gratings (see below).

The document WO 2020102658 A2 discloses a laser projection system for an intraoral scanner. Here the beam of a laser diode is widened by means optical elements and areally homogenised with regard to light intensity in order to illuminate a spatial light modulator. A spatial light modulator generates a measuring pattern by means of spatially discrete and optional reflection or absorption, the pattern being projected onto the object surface by means of a projection lens. By evaluating the projected image by means of a recording system a 3D recording is realised according to the known method of active triangulation.

The document WO 2019032923 A2 describes an intraoral scanner system, where a light engine which for example consists of one or more lasers illuminates a reflective spatial light modulator, wherein a double prism is designed such that the beam path folded to occupy a small space can in particular be split into light to be projected and light not be projected. The split takes place at the internal interface of the double prism in dependence of the angle, in which the light modulator reflects the light. This corresponds to the function of a micro mirror array, wherein for each displayable pixel a mirror setting leads to light being either projected through the subsequent lens or being absorbed within the projector in a so-called "light trap".

The projection approaches described in the documents WO 2020102658 A2 and WO 2019032923 A2 have in common that the projected pattern is generated by means of absorption or reflection. In both cases light is albeit being generated (in the light source) for pattern areas, which do not comprise the maximum generatable brightness, but this light, through absorption or reflection in a light trap, is not used for illuminating the object, but converted into heat within the projector.

The document US 2019388193 A1 describes an intraoral scanner and an associated method for recording intraoral objects. To this end the intraoral scanner has one or more light projectors and two or more cameras arranged in it. Each light projector comprises a pattern-generating optical element, which can generate a light pattern by means of diffraction or refraction.

The document DE 102014212231 A1 discloses a coordinate measuring device for the contactless surveying of surfaces of dental impressions. To this end the device includes an optical projection unit, an object capturing unit arranged in the beam path of the projection unit for capturing the object, at least one camera as well as an image processing unit for determining the coordinates on the basis of the image data recorded by the camera. A polarisation filter arranged between object and camera is provided for filtering out "disturbing light reflections", which often occur during recording of dental impressions and complicate the image processing required for determining the coordinates.

PRYGUN A V ET AL (Experimental research of speckle suppression efficiency in the entire visible spectrum using moving 3D composite diffraction grating", 27 Oct. 2017 (2017 Oct. 27), volume 47, no. 2, page 220-228) presents results of an experimental investigation into the efficiency of speckle suppression in the entire visible spectrum using a movable 3D composite diffraction grating.

The document DE 102015205187 A1 describes a method and a corresponding device for the projection line pattern sequences for recording an object surface by means of triangulation. An overall measuring pattern is projected, which comprises a series of measuring lines as measuring elements, wherein a respective combination of measuring lines (generated or not generated) in the overall measuring pattern encodes the respective location in the overall measuring pattern.

The document US 2019213753 A1 proposes a measuring device for surface recording, which projects structured light with a two-dimensionally encoded pattern onto a measuring object, wherein the pattern comprises several types of words, each word having a different two-dimensional structure and being distinguishable from one another. Determination of the three-dimensional position of a target pixel is based on the two-dimensionally encoded pattern being twice symmetrical and a predetermined word being repeated for each column in column direction.

The document JP 2019164325 A describes a light source system for use in a surface recording device. The light source system comprises a diffracting optical element with diffracting grating section by means of which a pattern can be projected. Further the diffracting optical element, on another surface, comprises a light correcting section of zero order, in order to reduce the zero order light generated in the diffracting grating section.

SUMMARY

Based on this state of the art it is the present disclosure proposes a method (as well as an intraoral scanner) for recording the topography of a translucent, in particular dental, object, which is characterised by improved suitability in practice, in particular as regards high recording accuracy, highly reliable movement speed during the scanning operation, high depth of focus, miniaturisation of the hand piece and low-cost realisability. As regards recording accuracy embodiments of the invention shall in particular solve the problem which emerges during (intraoral) recording of the topography of surfaces of translucent, in particular dental objects. Dental objects are typically partially permeable to light (translucent) and therefore comprise a comparatively high degree of translucence and volume scattering. This leads to incident light not only being scattered back from the surface to be recorded, of the translucent object, but also from material present below the surface.

This requirement is met by a method for recording the topography of the surface of a translucent, in particular dental object as well as by means of an intraoral scanner.

The method for recording the topography (of at least a part) of the surface of a translucent, in particular dental object (by means of structured illumination of the surface) including the steps of:
  recording a first partial topography of a first partial area of the surface and a second partial topography of the second partial area of the surface overlapping at least partially the first partial area, wherein the recording of the partial areas of the surface is performed, respectively, by
  by projecting an overall measuring pattern of the respective partial area of the surface of the translucent object by means of a projection system, wherein
    the projection system includes at least one light source and at least two diffractive optical elements,
    the overall measuring pattern comprises at least two different measuring patterns,
    the measuring patterns are projectable onto the surface and respectively comprise a plurality of measuring lines parallel to each other, and
    the measuring patterns each have one of the diffractive optical elements assigned to them, by means of which the measuring lines can be generated through light diffraction,
    the at least one light source (30) illuminates the diffractive optical elements (31) with linearly polarised light in a polarisation device (71), and a linear polarisation filter (70) is arranged between the surface (1) and the recording system (12), the direction of passage (72) of which coincides with the polarisation direction, and
  providing a first image and a second image of the respective partial area of the surface by means of a recording system, wherein in the first image a first of the at least two measuring patterns is projected onto the respective partial area of the surface and in the second image a second of the at least two measuring patterns is projected onto the respective partial area of the surface, and
  recording the respective topography of the respective partial area of the surface respectively by means of triangulation using the respective first image and/or the respective second image,
  recording the topography of the surface by at least partially superimposing the first partial topography and the second partial topography of the surface.

The intraoral scanner for recording the topography (of at least a part) of the surface of a translucent, in particular dental, object according to the above described method includes a projection system, a recording system and a computer system operatively connected to the projection system and the recording system,
  wherein the projection system includes at least one light source and at least two diffractive optical elements and is arranged to project an overall measuring pattern onto partial areas of the surface of the translucent object,
    the overall measuring pattern comprises at least two different measuring patterns,
    the measuring patterns are each projectable onto the surface and each comprises a plurality of measuring lines parallel to each other,
    the measuring patterns each have one of the diffractive optical elements assigned to them, by means of which the measuring lines can be generated by light diffraction,
    the at least one light source (30) illuminates the diffractive optical elements (31) with light linearly polarised in a polarisation direction (71), and a linear polarisation filter (70) is arranged between the surface (1) and the recording system (12), the direction of passage (72) of which coincides with the polarisation direction (71), and
  wherein the recording system is arranged to provide a first image and a second image of the respective partial area of the surface, and in the first image a first of the at least two measuring patterns is projected onto the respective partial area of the surface, and in the second image a second of the at least two measuring patterns is projected onto the respective partial area of the surface, and
  wherein the computer system is arranged
    to record a first partial topography of the first partial area of the surface and a second partial topography of the second partial area of the surface by means of triangulation respectively, using the respective first image and/or the respective second image, and to record the topography of the surface by at least partially superimposing the first partial topography and the second partial topography of the surface.

Embodiments of the present invention is based on the surprising knowledge that due to the use of diffractive optical elements for generating the measuring lines (or the measuring patterns) in synergetic interaction with the other inventive method features a method for recording the topography of the surface of a translucent, in particular dental, object is made possible, which is characterised by significantly improved suitability in practice, realised in particular by a high recording accuracy, high depth of focus, high reliable movement speed of the hand piece during the scanning operation, a high degree of miniaturisation of the hand piece and low-cost realisability.

This is based, on the one hand, on the knowledge that due to the use of diffractive optical elements (DOE) for producing the measuring lines and thus due to the use of light diffraction for measuring pattern projection, also called "diffractive" pattern projection, significantly higher light intensities relative to the applied light output of the light source can be achieved on the surface of the object. A diffractive optical element provides a low-cost and compact variant of a light diffracting pattern projection, wherein according to embodiments of the present invention each measuring pattern has its own (individual) diffractive optical element assigned to it. By using individually assigned diffractive optical elements it is possible to project several different measuring patterns in a building-space-effective and cost-effective manner.

Although the measuring patterns are thus projected from different (mutually distanced) projection origins, the resulting shading of individual measuring patterns (for example caused by overhangs of the object to be recorded) is surprisingly insignificant to such a high degree that even the high demands in this respect of an intraoral scanner can be met. This can be traced back in particular to the miniaturisation of the projection system (made possible by the synergetic interaction of all inventive features), as a result of which the distances of the projection axes may lie unexpectedly close next to one another. The high demands of an intraoral scanner as regards low shading are due to the fact that the dental objects to be recorded often comprise areas with overhangs or narrow gaps (for example gaps between teeth and cavities), which also must be capable of being recorded.

Diffractive optical elements comprise a diffractive structure (diffractive region), which is arranged to generate a defined measuring pattern by means of light refraction for light incident at a defined angle and of a defined wavelength. In this context one also speaks of the fact that a measuring pattern has been stored in a DOE. The diffractive structure is typically arranged in a plane of the diffractive optical element and is therefore also called a planar diffractive structure or diffractive plane/area.

An intraoral scanner requires a comparatively high spatial resolution/data density (measuring point per areal unit of the surface) and thus a comparatively high number of measuring elements to be projected. It is thus quite surprising that diffractive optical elements in the wavelength range of 400-480 nm (blue) advantageous for dental surfaces comprise a projection quality, even for a comparatively high number of measuring lines to be projected, which satisfies the high demands of an intraoral scanner. For the lower the wavelength and the more measuring lines to be projected, the more demanding is the development and manufacture of a DOE with sufficiently high projection quality. A high projection quality is characterised by a high resolution (corresponding here to a small measuring line width), a high contrast between light and dark areas, a high diffraction efficiency and a low light share in the zero diffraction order.

Embodiments of the present invention are also based on the knowledge that by means of inventive features a method for recording the topography of the surface of a translucent, in particular dental, object in connection with the advantages of the diffractive pattern projection can be provided, which is capable of projecting several different measuring patterns, which can be exclusively produced in the wavelength range of 400-480 nm (blue) especially advantageous for dental objects and in particular monochromatically (single-colour). Such a method and such an intraoral scanner according to the method have been completely unknown up to now in the art; for example the capability of projecting several different measuring patterns in the state of the art has been realised up to now by exclusively using imaging methods (i.e. using light refraction). To this end spatial light modulators (such as DLP) are employed, which are expensive and cannot be easily miniaturised. An essential knowledge, on which embodiments of the invention are based, is the surprising recognition that an inventive intraoral scanner (with the capability of projecting several different measuring patterns) is distinctly more cost-effective and can be better miniaturised than is achievable with the teaching known from the state of the art.

The capability of projecting several different measuring patterns, which according to the invention may be realised by assigning a respective diffractive optical element, is particularly advantageous in the context of an intraoral scanner, because this allows a temporal encoding of the measuring element to be realised in order to solve the correspondence problem. In the case of a single measuring pattern however, only spatial encoding is feasible. For spatial encoding a characteristic environment in the image of a measuring element is used for solving the correspondence problem. Since here the temporal component of encoding is missing, the environment used must be correspondingly larger, in order to achieve a clear solution to the correspondence problem. This, however, in turn limits the minimally resolvable sequence/environment of measuring elements, and in addition lowers the robustness in the face of interferences. In practice attempts are made to reduce this effect in that a colour coding is introduced. However, this means leaving the wavelength range of 400-480 ms especially advantageous for dental surfaces, which reduces the performance of a corresponding method. In contrast thereto, a combination of temporal and spatial encoding (hybrid encoding) can be realised for the projection of several different measuring patterns, whereby a small minimally resolvable sequence with simultaneously higher robustness against interferences is achieved. In other words, embodiments of an inventive method and an inventive intraoral scanner permit the connection of the advantages of diffractive pattern projection with the capability of projecting several different measuring patterns in a synergetic manner.

Methods and systems known in the state of the art for recording the topography of the surface of a translucent, in particular dental, object, which are capable of projecting several measuring patterns, use projection methods according to the principle of light refraction, i.e. the projection of the measuring patterns (or measuring lines) is carried out by means of an imaging optics. The imaging optics projects the content of a static slide or a dynamic image generator, also called spatial light modulator (e.g. a micro mirror array or a LCD element), onto the object surface. In the case of structured illumination, which is a subject of the present disclosure, these imaging projection methods are always afflicted by considerable light losses. The reason for this is that a structured illumination, by definition, is not uniform, and therefore contains local variations of light intensity on the surface of the object. The local reduction of light intensity vis-à-vis incident light on a static slide or a dynamic image generator is realised, depending on the function principle, either by absorption or by reflection of light. This absorbed or reflected light was generated by the light source, but does not reach the surface and is thus detrimental to the light efficiency.

If however pattern projection is realised by means of light diffraction, neither absorption nor reflection are effective in the production of structured illumination. Instead, the local variation in light intensity on the surface is directed, by means of targeted redirection of the incident light beam, to those sections (assigned to the measuring lines) of the surface, which are to appear brighter, and is directed away from areas, which are to appear darker. As a result, the generation of structured illumination through light diffraction is distinctly more light efficient.

The increase in light efficiency shall now be illustrated by way of an exemplary stripe pattern, which contains stripes of maximum brightness and stripes of minimum brightness, wherein 50% of the total area of the measuring pattern comprise maximum brightness and 50% comprise minimum brightness. In case of an imaging projection known in the state of the art for intraoral scanners the stripe pattern is generated by a spatial light modulator, which e.g. may be a static slide or in the dynamic case may be a micro mirror array or a LCD. The spatial light modulator is areally illuminated by a light source and produces the light and dark areas of the pattern by means of absorption/transmission or reflection. By neglecting all further optical losses the maximum achievable light efficiency here is 50%, since only half of the area of the light modulator corresponds to stripes of maximum brightness, and light incident on the remaining area is absorbed within the projection system. In the case of projection by means of light diffraction the stripe pattern can be generated by means of a diffractive optical element (DOE). An incident light beam is incident on the DOE, which redirects the same according to the measuring pattern definition into the corresponding areas to be illuminated. Internal losses of the DOE incurred thereby, for example the so-called diffractive efficiency, are typically in the single-digit percentage range. If small internal losses are neglected, generation of the measuring pattern takes place without absorption of introduced light. For the same light input therefore the result is double brightness/(light) intensity of the stripe patterns in comparison to the imaging projection. As a result an increase in light intensity of the illuminated sections of the surface is made possible, and at the same time the required light input (from the light source) and the accompanying size as well as the energy requirement of the light source can be reduced. The disclosed inventive teaching thus may allow (in comparison to the state of the art) an essential reduction (miniaturisation) of the projection system/hand piece and intraoral scanner.

An intraoral scanner should comprise a preferably compact hand piece in order to be able to have maximum access to those areas of the oral cavity which are to be recorded. Further a preferably compact hand piece is advantageous since it makes it easier for the operator to handle and in particular guide the hand piece during the scanning operation. Also a compact hand piece helps in realising a particularly pleasing design, which may be advantageous as regards marketing.

Due to the miniaturisation of the projection system (as taught by the invention) this can be arranged together with the recording system in the scan tip of the hand piece (of the intraoral scanner), whereby an advantageously slender housing design can be realised. Moreover this will allow to reduce the length of the path the light has to travel (from the light source to the surface and from the surface to the recording system), which can be of advantage for the projection and recording accuracy because for example the accuracy-damaging influence of a structural-mechanical use of the hand piece occurring in operation can be reduced in this manner.

Conventional projection systems, as e.g. described in WO 2018073824 A1, WO 2020102658 A2 and WO 2019032923 A2, can presently not be miniaturised to the extent where they can be fitted into the scan tip. Due to this fact the recording system and projection system must be arranged in the rear part of the hand piece, which requires a bulging out of the housing in this section. Due to the projection by means of light diffraction the projection system can be miniaturised to very small dimensions in comparison to other known methods, thus allowing this to be fitted in the far front of the scan tip. A bulging out of the rear part of the hand piece is then not necessary, thereby making it possible to design the hand piece in a distinctly more ergonomic and more pleasing manner.

A pattern projection by means of light diffraction by DOE is therefore, in the context of the intraoral recording of a topography, i.e. in the context of an intraoral scanner, advantageous since as a result thereof a compact, light-, energy- and cost-efficient intraoral scanner can be provided. The embodiments of the inventive intraoral scanner (or the hand piece) can, in other words, as a matter of principle, be realised in a more compact manner, since a pattern projection by means of diffraction does not require a (relatively large-volume) imaging projection lens nor a spatial light modulator.

Furthermore, embodiments of the present invention are based on the knowledge that the higher light intensity of the illuminated sections of the surface (or the measuring elements/measuring lines) (as made possible through the use of diffractive optical elements for generating the measuring lines) can be used for increasing the recording accuracy of the topography of the surface of the translucent, in particular dental, objects. Dental objects, as already mentioned above, comprise a comparatively high degree of translucency and volume scatter, which leads to incident light being reflected (scattered back) not only from the outer surface of the object to be recorded, but also from material, which is present below the surface. This effect leads, disadvantageously, to a measuring line projected onto the surface of a translucent object loosing contrast and thus appearing darker, lacking contrast and thus blurred (similar to defocusing). The position of the dark, low-contrast/blurred measuring line can only be identified with reduced accuracy in the images provided by the recording system, which has a detrimental effect on the recording accuracy of the topography of the surface. This effect can be countered by increasing the light intensity of the measuring line (or the section on the surface assigned to the measuring line), whereby a comparatively high recording accuracy can be achieved despite translucency of the object. Moreover the increase in light intensity can promote an increase in the depth of focus, which enlarges the usable working range of 3D recording. The working range of 3D recording is that range within which a surface must be arranged in order to be able to record its topography. The increase in depth of focus is made possible by a higher light intensity in the measuring lines, which for the same intensity of recording permits a smaller aperture (higher f-number) of the recording system.

Furthermore, by increasing the light intensity of the sections of the surface assigned to the measuring lines an increase in admissible movement speed can be made possible, because the exposure duration (integration time) required for providing the images can be reduced. The admissible movement speed is that maximum speed, with which the recording system when recording the topography can be guided across the surface to be recorded, without violating the accuracy demands of the topography recording (for example due to motion blur).

The use of diffractive optical elements for generating several different measuring patterns (including measuring elements, in particular measuring lines) represents a turning-away from the methods followed up to now in the state of the art for recording topographies of surfaces of translucent, in particular, dental objects, and which have in common that in order to generate several different measuring patterns (comprising measuring elements, in particular measuring lines), methods of light refraction have been used.

Diffractive optical elements are defined and manufactured, respectively, with regard to light of a specifically designed wavelength in order to project a (stored) designed measuring pattern. Only when using exactly this wavelength design is the stored measuring pattern design projected, since the generation of measuring lines for diffractive optical elements is based on the wavelength-dependent phenomenon of light diffraction. If the diffractive optical element is however used with light, which does not exactly correspond to its wavelength design, the resulting measuring pattern is distorted compared to the measuring pattern design, wherein such (measuring pattern) distortions can be brought about by a change in the distance between adjacent measuring lines and/or a curvature of the individual measuring lines.

During operation of a light source in practice small deviations of the emitted light spectrum from the specification are always to be reckoned with (spectral variation), which can be traced back to non-constant operating conditions (e.g. temperature of the light source) and/or scatter due to manufacturing. These deviations may be more pronounced, if the light source is used in a projection system, which is moved as part of a mobile hand piece, since various operating states are passed through during the application and the mobile hand piece is exposed to varying environmental conditions. These wavelength deviations lead to a diffractive optical element being used (at least partially) outside its wavelength design with the resulting measuring pattern comprising the above-mentioned distortions compared to the measuring pattern design (measuring pattern distortion), which has a detrimental effect on the achievable accuracy of the projection onto the surface (wavelength-dependent projection accuracy).

Imaging measuring pattern projection methods known from the state of the art (which are used in connection with the recording of the topography of translucent, in particular dental, surfaces) are based, by contrast, on the phenomenon of light refraction. Measuring pattern distortions (such as due to so-called chromatic aberration) caused by deviations in the wavelength of the emitted light can be practically eliminated here due to a respective layout of the imaging optics (e.g. due to achromatic lenses).

Surprisingly, despite this DO-immanent wavelength-dependent projection inaccuracy, the required very high accuracy can be achieved in an inventive intraoral scanner during recording of the topography of the surface. It has become evident that the disadvantage of the wavelength-dependent projection inaccuracy of the DOE is more than compensated for by the considerable advantages which can be achieved when implementing the present invention, in particular with regard to the higher achievable light intensity of the measuring lines and thus the thereby achievable higher recording accuracy. Thus, by using diffractive optical elements (for generating the measuring lines)—in particular when recording the topography of the surface of a translucent object (for which as described above a contrast weakening of the measuring line can be caused due to volume scattering)—an unexpectedly high accuracy can be achieved overall during recording of the topography.

Moreover embodiments of the present invention are based on the knowledge that the accuracy of recording the topography can still be further increased by further measures:

On the one hand, due to the fact that according to an advantageous design of the invention the diffractive optical elements are arranged on a common (one-piece) DOE substrate, wherein in particular, the diffraction structures (diffractive areas) of the diffractive optical elements are arranged in a common plane. This allows the need for an adjustment of the diffractive optical elements relative to one another (or adherence to close tolerances) in order to achieve a coordinated measuring pattern orientation and position to be eliminated in an advantageous manner. Due to a one-piece design of the diffractive optical elements it can be achieved that the planar diffraction structures lie in a common plane which corresponds to the surface of the common substrate. As a result equal projection distances of the measuring patterns and in particular an exactly identical scaling (i.e. projected size) of the measuring patterns on the surface can be realised in an advantageous manner. Furthermore, due to the one-piece design the cost and complexity of DOE manufacture are reduced, since less cutting and handling expenditure is incurred than for several separate DOEs. Furthermore projection inaccuracies which are caused by an erroneous alignment of the diffractive optical elements relative to each other can be excluded or at least reduced.

On the other hand, projection quality and cost efficiency can benefit from the fact that according to a further advantageous implementation of the invention the projection system includes a first device for adjustment of a position of at least one projection axis and/or a second device for adjustment, wherein by means of the second device for adjustment a distance between one of the diffractive optical elements and the at least one light source can be changed or a distance between a lens and the at least one light source can be changed. The lens may be arranged, in particular, between the at least one light source and the assigned diffractive optical element.

In this way an adjustment of the position of the projection axis (optical axes) and/or of the focal distances of the (laser) light sources can be achieved, which advantageously can increase cost efficiency of manufacture due to less stringent demands on the manufacturing tolerances.

It may be particularly convenient to bring the optical axes/the projection axes of the light sources into a common projection axis plane. To this end, close manufacturing tolerances with regard to the light source, the light source optics and the mechanics of the projection system may be used on the one hand. In terms of higher cost efficiency for the manufacture it is however advantageous to provide in the projection system a first device (individually adjustable for each light source) for adjusting the positions of the projection axes, in order to in particular ensure that all projection axes are arranged in a common plane. To this end the first device for adjustment may be arranged such that by means of a screwing device the translational and/or rotatory alignment (positioning) of each light source relative to the assigned diffractive optical element can be individually changed (up to certain extent).

A further enhancement in recording accuracy is achieved in that according to embodiments of the invention the at least one light source illuminates the diffractive optical elements with light linearly polarised in a polarisation direction, and a linear polarisation filter is arranged between the surface to be recorded and the recording system, the direction of passage of which coincides with the polarisation direction. In this way, in the context of an intraoral scanner, the natural polarisation of laser light can be utilised in order to realise, in combination with a polarisation filter between object surface and recording system, a light-efficient suppression of volume scatter of (translucent) dental surfaces.

The measuring pattern (or the structured illumination) projected onto the surface is, in the case of typically translucent, dental objects such as tooth enamel, dentin or gum, partially scattered back from the surface of the dental object. A significant part of the incident light however is also scattered back from material below it (below the surface), which was illuminated by volume scatter. The part of light scattered back from material below the surface leads to a loss of contrast and a distortion of the structured illumination recorded by the recording system. Thus, due to volume scatter with translucent objects, the detected location of the pattern projection (measuring elements) is changed by a slight shift of the points of gravity of the back scatter below the surface. Both the reduced contrast and the shift lead to errors during the recording of the dental surface, which may be disadvantageous for the signal/noise ratio and the accuracy of 3D recording.

In order to reduce the share of light not scattered back from the surface, a polarisation filter is arranged between object and recording system. Here the property of the surface of dental objects is utilised to mainly maintain the polarisation state of incident light for direct back-scatter on the surface. The polarisation state of the share of light scattered back by material from below the surface is however randomised, i.e. it does not maintain the polarisation state of the incident light, but assumes a mixed state. In other words: the share of light scattered back directly from the surface mainly maintains the polarisation direction of the illumination, whereas the part scattered back from below the object surface comprises a mixed, practically evenly distributed polarisation state. By using polarised light in connection with a polarisation filter between (object) surface and the recording system the relative share of light scattered back from the surface can be advantageously increased. As a result the signal/noise ratio of 3D recording and its recording accuracy can be improved.

Numerous projection systems known in the state of the art use light sources with a predominantly mixed polarisation state, such as LEDs or lasers the polarisation state of which became mixed for example by means of optical elements for generating an areal and intensity-homogenous illumination, for a light mix or speckle reduction. Since in these cases the light emitted onto the surface to be recorded would be non-polarised, a polarisation filter is required between the light source and the (object) surface in order to obtain a polarised projection. Such a polarisation filter leads, in the case of non-polarised light, typically to a reduction of at least 50% of the usable light. The embodiments of the present invention by contrast allows natural polarisation which commonly occurs with laser diodes to be directly utilised, thus avoiding a polarisation filter between light source and object and the losses connected therewith. This advantageously results in higher light efficiency and higher realisable light intensity on the object surface. In addition the polarisation filter as an optical component arranged between light source and (object) surface may be omitted.

The embodiments of the present invention thus permit a particularly light-efficient and low-cost utilisation of the advantages, which can accompany the use of polarised light, solely through the use of a polarisation filter between (object) surface and recording system and a respective alignment of the light sources by way of their natural polarisation direction.

The polarisation filter may basically be implemented as a transmissive or reflective polarisation filter. The polarisation direction of a transmissive polarisation filter is that polarisation direction in which the polarisation filter mainly transmits, in the case of a reflective polarisation filter it is that polarisation direction in which the polarisation filter mainly reflects. The said advantages can be obtained by using both linear polarisation and circular polarisation (provided the light sources used comprise the respective polarisation).

According to a particularly advantageous design of the invention the polarisation filter is polarisingly effective only in the emission spectrum of the at least one (laser) light source and neutral in the remaining spectrum. Suppression of volume scatter of dental surfaces can thus be spectrally selective. This is for example of advantage if the 3D recording (three-dimensional recording of the topography of a surface) occurs in another spectral range than the (simultaneously occurring) colour image recording (where it is not the topography of the surface which is recorded but the colour thereof). The suppression of volume scatter of translucent, dental surfaces may be less relevant for colour image recording than for 3D recording, since here no measuring pattern is usually recorded, but an illumination of homogenous distributed intensity. At the same time an illumination of the object surface for colour image recording may be generated at low-cost and with little technical complexity by means of LEDs, which often do not comprise a significant natural polarisation, by way of which they could be aligned in the direction of passage to the polarisation filter. A significant part of the generated non-polarised light would therefore be lost for the capture of a colour image (if using a non-spectral-selective polarisation filter). A spectral-selective polarisation filter may advantageously increase the light efficiency of a colour image recording, wherein the advantages of a suppression of volume scatter of dental surfaces are maintained for 3D recording.

In addition the recording accuracy of a measuring pattern projected onto the surface may be increased in that according to a further advantageous design of the invention the projection of the overall measuring pattern onto the respective partial area of the surface of translucent objects includes the reduction of speckle by means of a device for the reduction of speckle, optionally by moving, in particular in a translational manner, at least one of the diffractive optical elements during the projection of the overall measuring pattern (onto one of the partial areas of the surface of the translucent object by means of a projection system). To this end the projection system may include a device for the reduction of speckle, wherein optionally at least one of the diffractive optical elements may be movable, in particular in a translational manner (during projection of the overall measuring pattern).

A reduction of speckle is advantageous for improving the signal/noise ratio during 3D recording by means of the method for structured illumination. Speckle, also known in the optics as light granulation or laser granulation, is created while recording optically rough surfaces using coherent illumination, which is for example provided by laser light. Method for the reduction of speckle are known in the state of the art; a reduction of speckle can for example be achieved by averaging different speckle patterns (or speckle states) over time within the exposure time of the recording system (also called integration time).

Going beyond the state of the art speckle can be reduced for a measuring pattern projection by means of light diffraction using diffractive optical elements (DOEs) by in particular moving the diffractive optical element in a translational manner, since the speckle pattern due to moving the diffractive optical element (temporally and/or locally) is varied. Moving a diffractive optical element denotes, in this context, moving the diffractive optical element in a machine-operated manner/changing the position or place of the diffractive optical element.

This method for reducing speckle can also be used independently from the inventive method for recording the topography of the surface of a translucent, in particular dental, object (and independently of the inventive intraoral scanner) and therefore may represent an independent invention. The independent invention is a method for speckle-reduced measuring pattern projection and recording comprising the steps of:

irradiating a diffractive optical element in that a measuring pattern is stored, with a light source, wherein the light source is implemented in particular as a laser light source, projecting the measuring pattern onto the surface, recording an image of the projected measuring pattern on the surface by means of a recording system over the duration of an exposure time, and moving, in particular in a translational manner, the diffractive optical element during the exposure time.

The advantageous designs described in the following in the context of speckle reduction may be used in connection with the inventive method for recording the topography of a translucent, in particular dental object, the inventive intraoral scanner and/or with the method (representing an independent invention) for the speckle-reduced measuring pattern projection and recording.

According to an advantageous design the diffractive optical element may be movable in the plane of its diffractive structure (diffractive area).

According to an advantageous design the measuring pattern stored in the diffractive optical element may include measuring elements, which are designed as mutually parallel measuring lines, and the diffractive optical element may be movable in the plane of its diffractive structure (diffractive area) and in particular linearly in a translational manner in direction of the measuring lines. This design leads to a (due to the movement) particularly undistorted reproduction of the measuring lines, since these are moved only in direction of the measuring lines and not transversely thereto.

According to a further advantageous design movement may be in the form of linear oscillation. Linear oscillation can be generated by a linear drive (e.g. a linear motor or linear actuator) or a linear resonator. A linear resonator may be realised for example by means of a vibrating source (e.g. a rotatory or linearly unbalanced or vibrating motor) in conjunction with a spring or a spring system. A linear resonator may also be realised by an electromagnetic or other controllable stimulation of a spring-mass-system.

According to a further advantageous design the period of oscillation (reciprocal value of the oscillation frequency) corresponds to at most the exposure time (for the recording of the image) and/or the amplitude of oscillation is at least half the beam diameter (with regards to FWHM (full width half maximum)) of the incident light beam.

According to a further particularly advantageous design a force introduced by the oscillation into the hand piece of an intraoral scanner can be compensated for by a balancing force. The balancing force can for example be obtained by oscillation of a second mass for the same frequency and a 180° phase shift.

According to a further advantageous design the projection system may include at least one light source implemented as a laser light source, which in one dimension is single-mode and in a second dimension (direction) is multi-mode, wherein the second (multi-mode) dimension is aligned in parallel or vertically to the direction of the measuring lines. Such a construction can effectively reduce the speckle contrast due to a shorter coherence length of the laser light source.

According to a further advantageous design the projection system may include at least one light source implemented as a laser light source, the supply current of which is modulated with a frequency in the range from 1-1000 MHz. Such a high frequency modulation can eliminate laser mode hopping and shorten the coherence length of the emitted light. The elimination of laser mode hopping leads to a more stable spectral emission of the laser. Since a pattern projection by means of light diffraction is wavelength-dependent, the temporal stability of the projection and ultimately (in the present inventive application) the recording accuracy of the surface topography can be improved. Also, the shortening of the coherence length of the emitted light accompanying the modulation can additionally lead to speckle reduction, which is additionally advantageous for the accuracy of topography recording.

Moreover the accuracy of recording the topography of the surface can be increased in that according to a further advantageous design of the invention the measuring lines are calibrated by means of algebraic surfaces (areas) and triangulation is carried out optionally using these algebraic surfaces. Algebraic areas may be three-dimensional planes or areas displayable by higher degree polynomials, for example square or cubic areas. Conical areas in particular can also be used for calibrating the measuring lines. Triangulation can then be optionally carried out by forming points of intersection between sight lines of the recording system and the calibrated algebraic areas.

As already mentioned a diffractive optical element/the measuring pattern (design) stored therein (by designing the diffraction structure) can be defined and produced relative to a so-called wavelength design. In practice, however, an illumination spectrum, which exactly corresponds to the wavelength design, is very hard or only with great effort to realise. Commonly used light sources comprise a production-related spectral variation, and the emission spectrum is in addition dependent on other parameters such as for example the operating temperature. Other factors also come into play during measuring pattern reproduction, for example the direction of light incident on the DOE, (projection axis) because deviations of the illumination direction also lead to a deviation of the pattern generated by means of light diffraction. Since in practice the exact design conditions with regard to wavelength and illumination direction hardly ever exist, it has to be assumed that the measuring pattern projection will deviate from the original definition. If straight measuring lines are defined for a DOE under design conditions, these, for ideal design conditions (in the illuminated state), each generate a projection area, which can be described by means of a plane equation (projection plane). With conditions commonly deviating in practice from the design conditions the measuring lines projected onto the (object) surface are not exactly straight but curved, so that the projection surfaces generated by the measuring lines can be described with higher accuracy by higher degree algebraic surfaces (than this would be possible with projection planes.)

Therefore due to deviations from the design conditions occurring in practice, higher degree algebraic areas lead to a better calibration of the measuring lines, which can effectively enhance the recording accuracy if for example in terms of calibration the measuring lines are calibrated with algebraic areas, not as is common, with planes.

In summary, the present disclosure describes a method (and an intraoral scanner) for recording the topography of the surface of a translucent, in particular dental object, which comprises a higher light efficiency and thus a higher achievable light intensity of the structured illumination. The higher light efficiency is achieved directly by the absence of absorption or reflection during generation of the structured illumination by means of light diffraction. The recording accuracy can be additionally enhanced by maintaining a high light efficiency in that a polarisation of the structured illumination is achieved utilising the natural polarisation properties of laser diodes instead of using a non-polarised light source in connection with a polarisation filter between light source and object.

In the context of an intraoral scanner a maximisation of the light intensity of the structured illumination is particularly advantageous. One reason for this is that an intraoral scanner according to the state of the art is guided manually across the surfaces to be surveyed. During this process, particularly high speeds (movement speed) are generated in comparison to 3D scanners for other applications in relation to the size of the image content to be resolved and the necessary recording accuracy. In order to minimise an unavoidable movement blur the integration time of the structured illumination must be minimised, which in the case of several temporally sequential projections can be obtained by a shortening of the exposure time of the recording system. The minimally usable integration time is directly dependent on the light intensity generated by the projection system on the object surface. The higher the light intensity, the shorter the integration time can be chosen for a guaranteed necessary signal/noise ratio of the image recording. An intraoral scanner according to an embodiment of the invention therefore principally comprises a lesser minimum integration time and is thus more robust with regard to movement blur. In addition, due to the lesser minimum integration time the frequency of 3D recording (recording of the topography) can be increased. A high frequency of the 3D recording is particularly advantageous in the context of an intraoral scanner, since in this way, for a given movement speed of the hand piece, a larger overlap exists between respectively two partial topographies. The larger overlap in turn requires a better and more robust alignment of the partial topographies to each other.

A further advantage of a higher light intensity of the structured illumination is the fact that a higher depth of focus of image recording can be realised. In the context of an intraoral scanner a depth of focus as high as possible is of advantage since due to the topography of the oral cavity and the hand-guided movement of the intraoral scanner large changes in the distance from the object surface are to be expected in comparison to the size of the image contents to be resolved. A high depth of focus of image recording can, up to the diffraction limit, be achieved through a high f-number, i.e. a small aperture of the image capture. The higher the light intensity, the smaller the chosen aperture can be for a guaranteed necessary signal/noise ratio of the image recording.

A further advantage of the light efficiency realised with an embodiment of the present invention lies in the enhanced energy efficiency derived therefrom. Due to the energy efficiency of the intraoral scanner described here active cooling can be waived in comparison to other intraoral scanners known from the state of the art. This leads to savings in hardware cost and manufacturing complexity, and the appliance is quieter and requires less maintenance. In addition the hand piece generates less heat which may be more pleasant for the user (e.g. operator or patient). Besides an energy-efficient intraoral scanner is of advantage for a wireless operation using a power supply integrated into the hand piece.

A further advantage of embodiments of the invention described here is the fact that a more compact projection unit and thus a more compact hand piece (miniaturisation of the hand piece) can be realised in comparison to the state of the art.

In comparison to the state of the art the hardware cost of an intraoral scanner according to embodiments of the invention are distinctly less. In particular the dynamic spatial light modulator (such as a micro mirror array) commonly used in the state of the art and the control electronics required for this are very cost-intensive in comparison to the hardware required for embodiments of the present invention.

The described embodiments of the present invention therefore meet the demand for an intraoral scanner (for recording the topography of the surface of translucent, in particular dental objects), which is practicable to the highest degree and at the same time can be manufactured in a cost-efficient manner.

Due to the fact that recording of the topography of the surface is effected by at least partially superimposing two partial topographies of two (at least partially overlapping) partial areas of the surface, the recording accuracy of the topography can be increased—for recording inaccuracies (occurring in the overlapping area of the two partial areas) (e.g. caused by an unfavourable illumination situation and/or reflections) can be partially compensated for by the second partial topography, if the corresponding area there was recorded more accurately. Since in particular with the recording of translucent (in particular dental) surfaces such recording inaccuracies typically increasingly occur due to the translucence of the objects belonging to the surfaces, the described method is to a very high degree suitable for recording such surfaces. Superimposing the partial topographies can be performed by means of methods known in the state of the art, for example the ITP algorithm (Iterative Closest Point).

Recording the partial topographies of the partial areas of the surfaces by means of triangulation requires that the above described correspondence problem has been solved by means of a suitable method known in the state of the art. To this end it may be advantageously provided that:

the measuring lines are arranged on possible measuring line positions of the overall measuring pattern, wherein the possible measuring line positions correspond to a grating with a constant measuring line period, and a measuring line arranged on a possible measuring line position is denoted as a displayed measuring line and a possible measuring line position, which has no measuring line arranged on it, is denoted as a non-displayed measuring line, the first measuring pattern determines a first assignment of displayed measuring lines and optionally non-displayed measuring lines to the possible measuring line positions, the second measuring pattern determines a second assignment of displayed measuring lines and non-displayed measuring lines to the possible measuring line positions, and the first measuring pattern and the second measuring pattern are designed such that a combination of displayed and non-displayed measuring lines formed by the first assignment and the second assignment on the possible measuring line positions, makes it possible to solve the correspondence problem.

The measuring line period describes the distance between two adjacent possible measuring line positions. The assignment of displayed and non-displayed measuring lines to the possible measuring line positions is realised by means of the design of the diffractive regions of the DOEs assigned to the measuring patterns. It may be beneficial for the resolution/data density and the accuracy of the recording of the surface, if one of the measuring patterns assigns exclusively displayed measuring lines (and no non-displayed measuring lines) to the possible measuring line positions. In this context one also speaks of a full or dense measuring pattern.

According to a further advantageous design it may be provided that (displayed and non-displayed) measuring lines, which are assigned to a common possible measuring line position, form a group of measuring lines (assigned to the possible measuring line position), and a combination of displayed and non-displayed measuring lines within the group corresponds to a symbol (assigned to the possible measuring line position).

The total of all possible symbols is called alphabet. For example, for an overall measuring pattern consisting of two measuring patterns a group of measuring lines can form up to four combinations (states) of displayed and non-displayed measuring lines; this corresponds to an alphabet with up to four ($2^2=4$) symbols. For an overall measuring pattern consisting of three measuring patterns the alphabet may include up to eight ($2^3=8$) symbols.

For further clarification the listing below shows an alphabet consisting of four symbols (0, 1, 2, 3), which can be formed (by combining displayed and non-displayed measuring lines of a group) for an overall measuring pattern consisting of two measuring patterns:

symbol 0: combination of a non-displayed measuring line in the first measuring pattern and in the second measuring pattern, symbol 1: combination of a non-displayed measuring line in the first measuring pattern and a displayed measuring line in the second measuring pattern, symbol 2: combination of a displayed measuring line in the first measuring pattern and a non-displayed measuring line in the second measuring pattern, symbol 3: combination of a displayed measuring line in the first measuring pattern and in the second measuring pattern.

According to a further advantageous design it may be provided that the overall measuring pattern forms a symbol sequence (succession of symbols) the length (number of symbols) of which corresponds to the number of possible measuring line positions, and each possible measuring line position has exactly one symbol of the symbol sequence assigned to it, and a succession of a plurality of n symbols, which are assigned to adjacent possible measuring line positions, correspond to a word, and in the symbol sequence each (contained) word of the length n occurs only so often that solving the correspondence problem is made possible, and/or in the symbol sequence each (contained) word of the length n occurs, at the most, three times, in particular, at the most, two times.

The natural number n here denotes the word length of the symbol sequence. A word occurs for example twice in the symbol sequence, if the succession of adjacent symbols characteristic for the word occurs in two places in the symbol sequence.

For clarification the following exemplary (abbreviated) symbol sequence is given, which is designed such that each contained word of the word length three (n=3) occurs only once:

Symbol sequence: 0, 0, 0, 1 0, 0, 2, 0, 0, 3, . . . , 2, 3, 2, 3, 3, 3

The words are formed by respectively three (n=3) adjacent symbols:

word 1: 0,0,0
word 2: 0,0,1
word 3: 0,1,0

The solution of the correspondence problem consists in the assignment of indices of possible measuring line positions to detected measuring lines in images provided by the recording system. The indices of possible measuring line positions are natural numbers, wherein for example the first possible measuring line position carries the index 1, the second measuring line position carries the index 2, and the possible measuring line position k carries the index k. In the example given the assignment of the indices of possible measuring line positions to the words (and therefore to the symbol sequence) is as follows:

word 1: (1, 2, 3)
word 2: (2, 3, 4)
word 3: (3, 4, 6)
. . .

The solution of the correspondence problem may for example comprise the following steps:

detecting the combination of displayed and non-displayed measuring lines of possible measuring line positions of the overall measuring pattern in images provided by the recording system, assigning symbols to possible measuring line positions corresponding to the detected combinations of displayed and non-displayed measuring lines, forming words from the symbols, which are assigned to adjacent possible measuring line positions, and assigning indices of possible measuring line positions to the words.

It is pointed out that the merely one-time occurrence of a word in the symbol sequence in practice is not at any cost necessary for solving the correspondence problem. Rather, ambiguities can also be solved in that for example a limited working space for detecting invalid correspondences (and thereby for establishing unequivocal correspondences) is used.

According to a further advantageous design the symbol sequence may be implemented as a De-Bruijn sequence.

One design of the at least one light source as a laser light source may be particularly advantageous, because this allows an intraoral scanner to be realised which is particularly cost-efficient and compact. In addition a laser light source is capable of generating coherent and spectrally narrow-band light which is particularly suitable for generating a high-resolution (measuring) pattern projection by means of light diffraction because the effect of light diffraction is wavelength-independent.

According to a further advantageous design each diffractive optical element (and just each measuring pattern) may have an individual light source assigned to it. An individual (laser) light source assigned to each measuring pattern represents an efficient option of sequentially or simultaneously projecting a number of measuring patterns. In addition the light output to be delivered by the projection system may be distributed among a number of (laser) light sources, whereby the (output) requirements of a single light source are reduced and thus the total light output (often limited by local thermal framework conditions) can also be multiplied.

According to a further advantageous design an unstructured illumination can be generated by means of an illumination device on the surface of the object with evenly distributed intensity, wherein the unstructured illumination optionally comprises red, green, blue, white, ultraviolet, near-infrared or infrared light or a combination thereof. An illumination of this kind is advantageous for recording a locally resolved colour combination of the object surface (colour image recording). The illumination may be spectrally broadband (e.g. white) or spectrally narrow-band (e.g. red, green, blue, ultraviolet, near-infrared or infrared). A number of spectra or colours may be activatable or deactivatable. The unstructured illumination may for example be provided by means of LED illumination or by a combination of multi-coloured lasers. The illumination device may advantageously comprise a ring-shaped light source or a ring-shaped arrangement of light sources. The ring-shaped illumination device may then be arranged concentrically about the recording axis of the recording system, so that when viewed from the recording system a uniform illumination is achieved, but the view of the recording system onto the object is not obscured.

According to a further advantageous design the first measuring pattern may be projected in a first wavelength spectrum and the second measuring pattern may be projected in a second wavelength spectrum, with projection being simultaneous in particular, and the recording system may be set up spectrally selectively, such that the first image is provided by means of predominantly recording light of the first wavelength spectrum and the second image is provided by means of predominantly recording light of the second wavelength spectrum.

The term of predominantly recording of light of a certain wavelength spectrum has to be understood in this context such that with spectrally selective recording systems for spectrally selectively recording, light of a defined wavelength spectrum light outside the defined wavelength spectrum is also recorded for technical reasons, typically to a small extent, but by far the predominant part of the recorded light is to be assigned to the defined wavelength spectrum.

A spectrally selectively arranged recording system (spectrally selective recording system) may for example be implemented as an RGB colour camera (wherein RGB corresponds to "red", "green", "blue"), and projection of the measuring patterns may be performed at the same time by means of red, green and blue light as well as partial quantities or combinations thereof. Equally the recording system may be selective in other spectral areas, for example in two or more wavelength intervals of blue light. The projection system can then advantageously also project a number of measuring patterns at the same time in different (wavelength) spectra. Spectrally selective here means that the recording system can differentiate between different (wavelength) spectra/can assign the different spectra to different image channels and thus to different images. A spectrally selective recording system of this kind may also consist of several cameras and spectrally selective components, which are arranged between the cameras and the object surface. Such spectrally selective components may for example be implemented as dichroitic beam splitters, band pass filters or notch filters.

According to a further advantageous design of the invention the first measuring pattern may be projected in a first polarisation state or in a first polarisation direction and the second measuring pattern may be projected in a second polarisation state or in a second polarisation direction, with projection being simultaneous in particular, and the recording system may be set up polarisation-selectively or polarisation-sensitively, such that the first image is provided by means of predominantly recording light of the first polarisation direction or the first polarisation state and the second image is provided by means of predominantly recording light of the second polarisation direction or the second polarisation state.

If for example the first measuring pattern is projected in a first polarisation state and the second measuring pattern is projected in a second polarisation state (different from the first polarisation state), and the two projections take place at the same time, the two projected measuring patterns can be distinguished from one another with a respectively arranged recording system and be provided in two different images. The polarisation states can comprise linear polarisation states of different directions or circular polarisation states of different directions such as RHCP (Right Hand Circular Polarisation) or LHCP (Left Hand Circular Polarisation), or combinations thereof.

A polarisation-selective recording system corresponds to a recording system, which is capable of differentiating between polarisation states/of recording image information dependent on the polarisation state in different image channels (and thus in different images).

A polarisation-sensitive recording system corresponds to a recording system, which provides at least one image channel, which corresponds to a defined polarisation state.

According to a particularly advantageous design two measuring patterns can be projected simultaneously with different linear polarisation directions, wherein the two linear polarisation directions are orthogonal to each other. If both light sources are implemented as laser light sources, each of which emits linearly polarised light, the linear polarisation directions can correspond to the natural polarisation of the respective light source, wherein the orthogonality can be realised, as regards the emission direction (or projection axis), by installing the laser light sources rotationally offset by 90°.

According to another advantageous design two measuring patterns can be projected simultaneously with different circular polarisation directions, wherein one of the measuring patterns comprises the polarisation state RHCP and the other measuring pattern comprises the polarisation state LHCP.

According to a further advantageous design at least one of the measuring patterns can be designed point-symmetrically to a measuring pattern centre point and the assigned diffractive optical element can be optionally designed as a binary diffractive optical element. Particularly advantageously all measuring patterns are each designed point-symmetrically to their respective measuring pattern centre point and all diffractive optical elements are designed as binary diffractive optical elements.

Binary diffractive optical elements comprise a higher diffractive efficiency and therefore reach a higher light efficiency. Furthermore they can be manufactured in a simpler and more cost-effective manner than non-binary DOEs, and the maximum projectable opening angle is larger for a given light wavelength and quality of pattern projection. The pattern projection of binary DOEs are, as a matter of principle, designed symmetrically to a measuring pattern centre point, wherein the measuring point centre point lies on the projection axis P (which corresponds to the axis of the incident laser beam). Centre-point-symmetrical patterns are therefore preferably used as measuring patterns to be projected because they can be produced with binary DOEs.

Binary diffractive optical elements thus represent a particularly light-efficient and cost-effective design of pattern projection by means of light diffraction, even though only point-symmetrically constructed measuring patterns can be generated.

Measuring lines are generally particular suitable as measuring elements because they can generate a particularly high number of re-constructible measuring points (or pixels).

According to a further advantageous design the measuring patterns can each be projectable onto the surface in direction of a projection axis and the projection axes can be arranged in a common projection axis plane, which is parallel to the direction of the measuring lines, and at least one measuring pattern centre point of a measuring pattern can optionally be arranged in the projection axis plane. A projection axis is to be understood here as a geometric straight, which passes through the centre point of the beam incident on the diffractive optical element. The direction of the measuring lines is defined by the length extension of the measuring lines. This arrangement advantageously causes a spatial constancy of the overall measuring pattern. The overall measuring pattern is created by superimposing the plurality of projected measuring patterns. A spatial constancy of the overall measuring pattern here indicates that depending on the projection distance the overall measuring pattern merely changes as regards scale/size, but not as regards the scale-related distances of the measuring lines to each other (vertical to the direction of the measuring lines). A spatial constancy of the overall measuring pattern is advantageous for topography recording by means of structured illumination, since it makes possible a reproducible, distance-independent assignment of measuring lines from several measuring patterns to each other. In addition this allows a number of measuring patterns consisting of measuring lines to be brought into an exact overlap, which is advantageous for a 3D reconstruction method, which requires that measuring lines of different measuring patterns are locally assigned.

According to a further advantageous design the projection of measuring patterns can take place at different opening angles. In this way it can be achieved that the measuring patterns jointly cover a desired surface area in the working plane, wherein the respective opening angle of measuring pattern projection is chosen such that in the working plane the desired surface area is completely jointly covered, and the covering of remaining areas (areas outside the desired surface area) is minimised. The working plane is that plane, in which the optical components required for topography recording are laid out for optimal functioning. A jointly covered surface area of the projected patterns (pattern projection) is advantageous in terms of joint processing of the measuring patterns according to the method of structured illumination. Since according to embodiments of the invention different pattern projections do not comprise the same projection origin, joint covering of a desired surface area can be achieved by means of different opening angles, wherein the non-desired projection onto remaining areas can be minimised. Projection onto remaining areas is particularly undesirable because it reduces the light efficiency of the projection system and produces undesirable light scatter. This design is therefore advantageous in terms of light efficiency and quality of measuring pattern projection. In other words, in order to achieve a jointly covered area of measuring pattern projections for simultaneously optimal light efficiency, it is proposed to minimise the respective opening angles of the projections of measuring patterns, which can be realised by means of different opening angles of individual DOEs.

According to a further advantageous design of the invention the projection system can comprise at least one astigmatic lens (or optics).

According to a further advantageous design of the invention at least one of the diffractive optical elements can be effective in a light-focusing manner.

According to a further advantageous design the projection system may comprise at least one beam splitter and at least one spatial light modulator, wherein the light modulator is arranged in particular between the beam splitter and the surface of the object (i.e. the light modulator relative to the propagation direction of light behind the beam splitter). A spatial light modulator may be realised by means of a liquid crystal display (e.g. LCD or LCoS) or other methods of spatial light modulation. The term modulatable here refers to the capability of controlling a transmission, reflection, absorption or phase position of the outgoing light beam vis-à-vis the incident light beam.

According to a further advantageous design the projection system may comprise an illumination device for generating an unstructured illumination on the surface of the object with evenly distributed intensity and the unstructured illumination may optionally comprise red, green, blue, white, ultraviolet, near-infrared or infrared light or a combination thereof.

According to a further advantageous design at least one operating parameter of an (at least one) light source implemented as a laser light source may be controlled and/or the at least one operating parameter may be modulatable at a frequency in the range from 1-1000 MHz. The control may for example concern parameters such as temperature or amperage, or a combination thereof. Both optional features (control and high frequency modulation) can reduce fluctuations of light emission both as regards the emitted spectrum and also the emitted light output.

According to a further advantageous design the projection system can generate the measuring patterns in particular in the wavelength range of 400 nm-480 nm. This may be realised in particular in that the at least one light source emits in the wavelength range of 400-480 nm. This wavelength range is advantageous for the 3D recording of translucent and in particular dental surfaces since these here comprise a particularly low effect of volume scatter and penetration depth of the light. This leads to an improvement of the signal/noise ratio and thus of the accuracy of 3D recording.

According to a further advantageous design of the invention the intraoral scanner may comprise a deflection mirror. The deflection mirror is an optical component, which with an intraoral scanner can offer advantages with regard to accessibility of relevant regions without the oral cavity. The deflection mirror may be heatable in order to prevent it misting up due to highly humid breath. Heating to a temperature between approx. 37 and approx. 42° C. leads to humidity in the breathed out air not being condensed on the mirror surface and to the mirror reflecting light in an optimal manner; other temperature ranges may also have the desired effect.

BRIEF DESCRIPTION OF THE DRAWING

The invention will now be described in detail by way of exemplary embodiments in conjunction with the figures, in which FIG. 3 shows a schematic representation of an exemplary embodiment of an intraoral scanner according to the invention for recording a first partial topography in a first position and for recording a second partial topography in a second position, FIG. 4.1 shows a schematic representation of an exemplary embodiment of a projection system of an intraoral scanner according to the invention in a side view, FIG. 4.2 shows a schematic representation of an exemplary embodiment of a projection system of an intraoral scanner according to the invention in a top view, FIG. 4.3 shows a schematic representation of three diffractive optical elements of an exemplary embodiment of an intraoral scanner according to the invention, arranged on a common substrate, FIG. 4.4 shows a schematic representation of a measuring pattern of an exemplary embodiment of an intraoral scanner according to the invention, FIG. 4.5 shows a schematic representation of a projection system of an exemplary embodiment of an intraoral scanner according to the invention in a top view, FIG. 5.1 shows a schematic representation of a projection system of an exemplary embodiment of an intraoral scanner according to the invention in a top view and a side view, FIG. 5.2 shows a schematic representation of an exemplary embodiment of a projection system of an intraoral scanner according to the invention in a top view and side view, FIG. 6.1 shows a schematic representation of an exemplary embodiment of a projection system of an intraoral scanner according to the invention in a top view, FIG. 6.2 shows a schematic representation of a light modulator of an exemplary embodiment of an intraoral scanner according to the invention in a top view, FIG. 7 shows schematic representations of measuring patterns forming an overall measuring pattern and FIG. 8 shows a schematic representation of an exemplary embodiment of an intraoral scanner according to the invention.

DETAILED DESCRIPTION OF THE PREFERRED EMBODIMENTS

Figure 1:
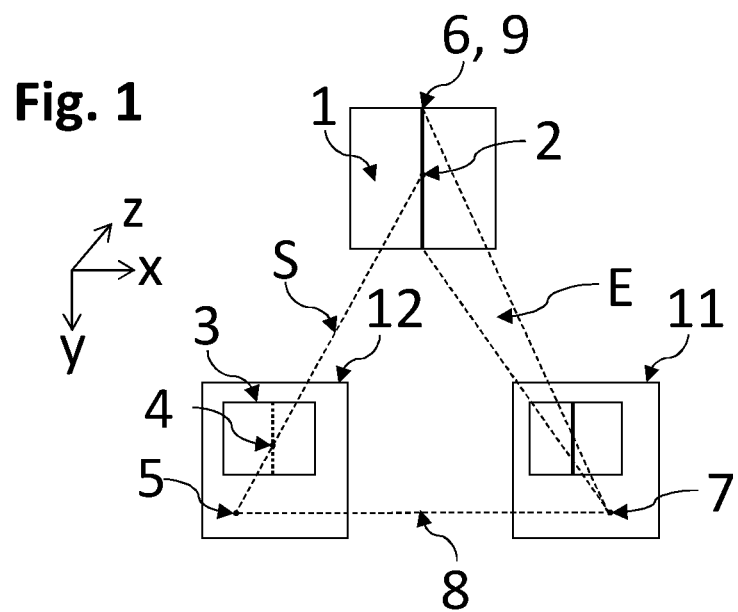
FIG. 1 shows a schematic representation of the method of structured illumination in conjunction with triangulation, jointly also called active triangulation, as known in the state of the art, FIG. 2.1 shows a schematic representation of an exemplary embodiment of an intraoral scanner according to the invention in a side view, FIG. 2.2. shows a schematic representation of a further exemplary embodiment of an intraoral scanner according to the invention in a side view, FIG. 2.3 shows a schematic representation of an exemplary embodiment of an intraoral scanner according to the invention in a top view, limited to the area of the scan tip.

The general background of the present invention will now be discussed initially with reference to FIG. 1 by describing in detail the method of structured illumination in conjunction with triangulation (also jointly called active triangulation method) known in the state of the art (see also the reference books "Multiple View Geometry in Computer Vision" by Richard Hartley et al, or "Handbook of 3D Machine Vision" by Song Zhang). The method of active triangulation can be used in order to record the topography of the surface 1 of an object. FIG. 1 shows this by way of example for a device consisting of a projection system 11 and a recording system 12.

The projection system 11 projects a measuring pattern 6, here merely consisting of one measuring element formed as a measuring line 9 on the surface 1 (the topography of which shall be recorded). The recording system 12 records an image 3 of the projected measuring pattern on the object surface. In this image 3 a plurality of pixels can be detected which represent the projected line, wherein for better overview only one pixel 4 is marked. In a measuring pattern comprising measuring lines the centres of the measuring lines are ascertained in practice as local (light) intensity maxima and used for constructing the visible straights S. By using a plurality of calibrated parameters of projection system and recording system an intersection 2 of the visible straights S and the projection plane E can be calculated by means of geometrical calculations, which corresponds to a recorded three-dimensional coordinate of the object surface in the coordinate system x, y, z. The three-dimensional projection plane E represents the "light plane" (assigned to measuring line 9) projected by the projection system 11 and also results from calibrated parameters of the system. The calibrated parameters include for example so-called intrinsic parameters of the projection and recording system such as focal distance, pixel/projection centre point and so-called distortion parameters as well as extrinsic parameters such as the position of projection origin 7 and pixel origin 5 relative to each other and thus also the so-called triangulation basis 8. Methods for calibrating respective systems are known in the state of the art, also the geometric calculations required for triangulation. In practice one or more different measuring patterns are projected. The measuring patterns may contain one or more measuring lines or may be formed in a completely different manner, e.g. in the form of point patterns or colour-coded stripe patterns. In the example shown the measuring pattern 6 consists of only one measuring line 9. Since here only one "light plane" is projected and thus only one projection plane E exists, there is also talk of a "trivial" solution of the correspondence problem. The correspondence problem consists of assigning a pixel to a projected measuring element, for example a measuring line. If the measuring pattern 6 comprises more than one measuring line 9, an approach for solving the correspondence problem is required. As explained in the description of the state of the art, a plurality of methods is known for solving the correspondence problem, where the measuring elements are coded by means of, for example, different colours (colour-coded measuring elements) and/or a characteristic presence or absence of measuring elements (presence-coded measuring elements). Both temporal and spatial coding as well as hybrid forms of both methods (hybrid coding) are known.

FIG. 2.1 shows a schematic representation of an exemplary embodiment of an intraoral scanner according to the invention in a side view, including a hand piece 110 and an evaluation device 120 operatively connected to the hand piece 110 via an interface unit 124.

The hand piece 110 comprises a hand piece housing 10, a projection system 11, a recording system 12, a control unit 13, a scan tip 14, a deflection mirror 15, a user interface 16, an energy store 17, a polarisation filter 70 and an illumination device B.

The control unit is operatively connected to the projection system 11, the recording system 12, the illumination device B, the deflection mirror 15, the user interface 16 and the interface unit 124.

In order to avoid misting up of the deflection mirror 15 this can be heated. Heating of the deflection mirror 15 can be controlled by the control unit 13 on the basis of a measured temperature of the deflection mirror (in particular the surface thereof).

The user interface 16, in operative connection with the control unit 13, indicates by means of different light signals an operating state of the intraoral scanner and allows a change between operating states by means of actuating a button.

The projection system 11 comprises three light sources 30 implemented as laser light sources with focusing optics (e.g. convex lenses) not shown as well as three diffractive optical elements 31 and is arranged for projecting an overall measuring pattern comprising three measuring patterns on the surface 1 (and thus illuminating the surface 1 in a structured manner). Each laser light source 30 illuminates the diffractive optical element 31 assigned to it with laser light in direction of a projection axis P.

The measuring patterns 6 generated by irradiating the diffractive optical elements 31 by means of light diffraction are projected, in direction of the projection axes P/after deflection by means of the deflection mirror 15 in direction of the projection axes P*, onto partial areas of a translucent, in particular dental surface 1 of an object.

The illumination device E is implemented as an LED illumination and emits spectral broadband light for an unstructured illumination of the surface 1. In addition it is shaped as a ring concentrically about the recording axis of the recording system 12 and in particular formed such that the view of the recording system 12 onto the surface 1 is not obscured.

Images of the partial areas of the surface 1 to be recorded can be provided along the recording axis R/R* by means of the recording system 12, which can be implemented for example as a monochrome or colour camera. Recording is effected by means of the polarisation filter 70.

The images provided by the recording system 12 can be transmitted by means of wireless or wired data transmission via the interface unit 124 to the computer system 121 as well as the evaluation device 120 comprising a visual output system 122. In case of a wired connection power supply is also wired via the interface unit 124; in case of a wireless connection the energy store 17 is needed for supplying power. Direct data transmission between the hand piece 110 and the evaluation device 120 is also possible. The evaluation device 120 may for example be implemented as a PC or laptop. The topography of the surface can be recorded by means of the computer system 121 using the images of the partial areas of the surface 1 to be recorded, and provided for example as a three-dimensional data model. The visual output system 122 may be implemented as a screen and permits a display of the topography of the surface.

The interface unit 124 includes a power display with mains connection; it may be designed so as to be suitable as a storage location for the hand piece. In case of a wireless hand piece the power supply of the interface unit 124 can be utilised as a charger for the energy store 17 in the hand piece 110. In case of a wired hand piece 110 the interface unit 124 may contain a USB hub, through which the hand piece is connected to the evaluation device 120, and the power supply in the interface unit 124 can be utilised as direct power supply for the hand piece 110.

In order to facilitate the intraoral recording of the topography of the surface of a translucent, dental object it is convenient to construct the front part of the hand piece 110, the so-called scan tip 14, in a compact manner such that this can be introduced into the oral cavity of a patient. To this end it is convenient if the scan tip 14, within an insertion length L, does not exceed a maximum diameter D. For example, within the insertion length D of 7 cm, the maximum diameter D of the scan tip 14 should not exceed a value of 4 cm.

FIG. 2.2 shows a schematic representation of a further exemplary embodiment of a slender hand piece 110a (slender in comparison to FIG. 1) of an inventive intraoral scanner 100 in a side view, wherein the (miniaturised) projection system 11 is arranged together with the recording system 12 in the scan tip 14.

FIG. 2.3 shows a schematic representation of a further exemplary embodiment of a slender hand piece 110b (slender in comparison to FIG. 1) of an inventive intraoral scanner 100 in a top view. Different from the exemplary embodiment according to FIG. 2.2 the projection system 11 and the recording system 12 are arranged next to each other in the top view. In this way it is possible to use a scan tip 14 with as low (flat) a profile as possible, so that accessibility of regions deep in the oral cavity can be improved.

By way of FIG. 3 it is illustrated, how the intraoral scanner 100 according FIG. 2.1 for recording the topography of the surface 1 of a translucent, dental object O can be used. For better clarity not all details of the hand piece shown in FIG. 2.1 are drawn in FIG. 3.

An operator continually moves the scan tip 14 of the hand piece 110 along a movement path across the part of the surface 1 of the object O to be recorded. The hand piece 110, in a first point in time, moves through a first position I (see hand piece 110.I) which enables the overall measuring pattern comprising the three measuring patterns to be projected onto a first partial area B.I of the surface 1 (positioning the hand piece in the first position). The recording system 12 is arranged for providing a first image, a second image and third image of the first partial area B.I, wherein in the first image the first measuring pattern, in the second image the second measuring pattern, and in the third image the third measuring pattern is projected onto the surface 1. The three images can be provided (captured) either simultaneously or sequentially. Conveniently the exposure time (integration time) is chosen to be as short as possible (in particular less than 20 ms) in order to minimise movement blur effects (caused by a continuous movement of the scan tip during capture/provision of the images).

The three images provided in the first position I are transmitted by means of wireless or wired data transmission to the evaluation device 120. The computer system 121 is arranged to provide a first partial topography of the first partial area B.1 by means of triangulation using the three images provided (captured) in the first position I.

At a second point in time (following the first point in time) the hand piece 110 guided by the operator moves through a second position II (see hand piece 110.II), which allows the overall measuring pattern comprising the three measuring patterns to be projected onto a second partial area B.II of the surface 1 (positioning of the hand piece in the second position), wherein the second partial area B.II partially or wholly overlaps the first partial area B.I. The recording system 12 provides (captures) a first image, a second image and a third image of the second partial area B.II of the surface 1, wherein in the first image the first measuring pattern, in the second image the second measuring pattern and in the third image the third measuring pattern is projected onto the surface 1. Once the three images captured in the second position II have also been transmitted to the evaluation device 120, the computer system 121 provides a second topography of second partial area by means of triangulation using the three images provided (captured) in the second position II.

Further the computer system 121 is arranged to provide an (overall) topography of the part of the surface comprising the first and the second partial area of the surface by partially overlapping the first partial topography (of the first partial area B.I of the surface) and the second partial topography (of the second partial area B.II of the surface).

In addition FIG. 3 shows the so-called working plane A. The working plane A is that plane, on which the optical components of the projection system 11, the recording system 12 and the illumination device B are laid out for optimal functioning. The layout concerns for example the focal distances of projection system and recording system, the spatial position of the projection axis and recording axis relative to each other or the beam shaping of the illumination system.

Accordingly a surface 1 can be recorded with best possible quality if this lies in the working plane A. If it lies outside the working plane A, as is unavoidable in practice, but within the admissible working range, it can nevertheless be recorded with a quality appropriate to the application since the optical components are laid out for maintaining the function within the working range (for example as regards the depth of focus of the projection and recording optics). A position of the working plane A appropriate to the application would be for example at a distance of approx. 5 mm from the surface of the scan tip (outside the scan tip). The working range may for example extend, starting from the working plane A, in direction of the scan tip up to the surface of the scan tip, and in the opposite direction up to a distance of approx. 20 mm.

FIGS. 4.1 to 4.5, which show two projection systems 11 of two different exemplary embodiments of an inventive intraoral scanner, will now be used to explain in more detail the construction and functionality of projection systems 11.

FIGS. 4.1 and 4.2 show a schematic representation of a projection device 11 of an exemplary embodiment of an inventive intraoral scanner in a side view (FIG. 4.1)/a top view (FIG. 4.2). The projection system 11 comprises three light source 30 implemented as laser light sources and three diffractive optical elements (DOEs) 31.

The light sources 30 emit light beams focused on to the working plane A in direction of the projection axes P, the beams being split selectively according to the pattern definitions by means of light diffraction into a plurality of beams by the diffractive optical elements 31 and deflected, whereby three focused measuring patterns are projected (each in direction of the respective projection axis P).

The light sources 30 each have one of the three diffractive optical elements 31 assigned to them, each generating an assigned measuring pattern stored (therein). The light-diffracting effect of the diffractive optical elements 31, i.e. the generation of the measuring patterns under incident light, is effected respectively by diffraction structures 36 arranged on or in the diffractive optical element, wherein the diffraction structures 36 are implemented in the present embodiment as planar diffraction structures (diffractive areas). According to the embodiment shown in FIGS. 4.1 and 4.2 the three planar diffraction structures 36 of the diffractive optical elements 31 are arranged in a common plane on a common one-piece (DOE) substrate 31S. The three diffractive optical elements 31 are thus constructed in one piece.

Projection of the measuring patterns takes places at respective opening angles 33, which correspond to the minimal opening angles, for which an area in the working plane A defined by the projection width W is just about still obscured by all measuring patterns.

FIG. 4.3 shows three diffractive optical elements 31 constructed in one piece on a common substrate 31S, each with an individual diffraction structure 36 (diffractive area) for the respective measuring pattern in a frontal view.

The projection system 11 according to FIGS. 4.1 and 4.2 further includes a first device V1 and a second device V2 for adjustment as well as a device for the reduction of speckle V3.

By means of the device for the reduction of speckle V3 the diffractive optical elements 31, 31S can be moved in a linearly translational manner (movable by mechanical operation).

According to a further advantageous embodiment not shown light emitted by the light source 30 is not focused onto the working plane A. Focussing onto the working plane A is instead performed by the DOEs 31, 31S, whereby a corresponding optics (focussing optical component) can be omitted.

FIG. 4.4 schematically shows the (undistorted) measuring pattern 6 generated by one of the three diffractive optical elements 31 (according to FIGS. 4.1 to 4.3) on a surface 1 (arranged in the working plane A), which comprises mutually parallel measuring lines 9 as measuring elements and is symmetrically arranged about the measuring pattern centre point 37. In terms of the present application the measuring pattern projected onto the surface 1 (and generated by light diffraction) is also denoted as measuring pattern projection, or projection of the measuring pattern onto the surface.

FIG. 4.5 shows a schematic representation of a projection device of a further exemplary embodiment of an inventive intraoral scanner in a top view comprising three light sources 30, each implemented as a laser light source with collimation optics as well as three diffractive optical elements 31 (DOEs). The light sources 30 are oriented such that their projection axes P intersect in a common point F on the working plane A. Furthermore the foci of the light sources 30 are set to this point F on the working plane A by means of collimation optics. Focussing can however also alternatively be advantageously effected by the DOEs 31, whereby the collimation optics can be omitted. The diffraction structures 36 (diffractive areas) of the DOEs in the embodiment as per FIG. 4.5 are each oriented vertically to the projection axes of the light sources and implemented as separate individual DOEs, but can alternatively have a common orientation and be arranged on a common one-piece DOE substrate (corresponding to 31S). The latter arrangement requires a corresponding layout (design) of the diffractive areas 36 for obliquely incident laser beams (i.e. not vertical for DOE surfaces). One advantage of the embodiment shown in FIG. 4.5 is that a jointly obscured area of the measuring pattern projections can be achieved with smaller opening angles 33 of the individual pattern projections than would be the case with parallel projection axes P, which leads to higher light efficiency.

FIGS. 5.1 and 5.2 respectively show schematic cut-outs of a projection system 11 of inventive intraoral scanners 100. For reasons of clarity the display is limited in each case to a single light source 30, a single diffractive optical element 31 and a single pattern projection.

FIG. 5.1a shows a light source 30 with collective lens optics 40 (e.g. a spherical or aspherical lens optionally comprising astigmatism), which is arranged to focus light emitted from the light source 30 onto a working plane A. A diffractive optical element 31 generates a measuring pattern projection (or measuring pattern) by means of light diffraction. The representation in FIG. 5.1a is a top view; FIG. 5.1b shows the same embodiment in a side view.

With diffractive pattern projection there is, as a rule, a share of the incident light, which is not diffracted, the so-called "zero order", "0th order" or "0th diffraction order". In practice attempts are made, by means of optimising the DOE design (i.e. the design of the diffractive area), to minimise the zero order, since it does not, as desired, contribute to the pattern projection (or measuring pattern). In practice the zero order can typically be reduced to a share of 0.1-1% of the incident light. Such a share usually leads to the zero order generating nevertheless the highest (light) intensity in the projected measuring pattern. As such it is also usually the variable which is critical for eye safety of the projection system, and thus limiting for the maximally delivered light output whilst adhering to an eye safety class. The zero order usually occurs in the form of a bright spot in the middle of the projected measuring pattern. Since it is typically not part of the desired measuring pattern projection, it is usually also a source of interference, for example when interpreting the projected measuring pattern by means of image processing.

FIG. 5.2, in a top view (FIG. 5.2a) and a side view (FIG. 5.2b) respectively, shows an advantageous variation (extension) of the embodiment of FIG. 5.1 with the aim of reducing the intensity of the zero diffraction order. The extension consists in that the collective lens optics 40 in the light source 40 does not focus emitted light onto the working plane A, but preferably collimates it. Other focus settings as collimation are possible and also meaningful depending on the application, it is however of advantage if the focus does not lie within the working range of the intraoral scanner. The light beam formed by the collective lens optics not focused onto the working plane A is incident on an astigmatic optics (lens) 41 added in comparison to the embodiment of FIG. 5.1, which focusses light predominantly in one dimension onto the working plane. The astigmatic optics 41 is implemented here as a cylinder lens optics, wherein the cylinder axis runs parallel to the X-axis shown in FIG. 5.2. The light focused in one dimension is incident on a DOE 31, which generates a (measuring) pattern projection, i.e. in particular a measuring pattern comprising measuring lines by means of light diffraction. The measuring lines are oriented parallel to the cylinder axis of the cylinder lens optics (as well as the X axis). As a result the pattern projection onto the working plane A (which extends vertically to the Z axis) is focused in direction of the Y axis and unfocussed in direction of the X axis.

The (light) intensity of zero order is effectively reduced due to this embodiment, since the incident light is focused in only one direction (dimension), and collimated or defocussed in the other direction. As a result the zero order does not generate a focused point of high light intensity in the measuring pattern centre of the pattern projection, but a line of reduced light intensity. The (light) intensity of the line is inversely proportional to its length, which in turn is proportional to the defocusing of the incident light in the X axis. Since the line extends along the measuring lines of inventive measuring patterns, it does itself not cause any defocusing of the measuring pattern.

When extending this embodiment to a number of light sources it is advantageous to use an astigmatic optics jointly for some or for all light sources. The light sources must then be arranged linearly in direction of the cylinder axis.

Instead of a combination of collective lens optics and cylinder lens it is also possible to advantageously use a single lens or lens system with defined astigmatism for each light source. Analogously to the embodiment described in FIG. 5.2 such a projection system 11 can effectively reduce the intensity of the zero order in that instead of a focal point on the working plane A, a focal line is generated, which extends along the direction of the measuring lines of the measuring pattern.

FIG. 6.1 shows a schematic representation of the projection system 11 of a further embodiment of an inventive intraoral scanner in a top view, which advantageously permits projection of several measuring patterns by means of light diffraction in a cost-effective and compact manner. A light source 30 emits a light beam, which is split and deflected by a combination of beam splitters 50 and mirrors 52.

In an advantageous implementation of beam splitting all three outgoing beams comprise the same photometric output. In case of three-fold beam splitting this can be achieved by means of a first beam splitter 50 with approx. 33.3% transmission and approx. 66.7% reflection, a second beam splitter 50 with approx. 50.0% transmission and reflection as well as a mirror 52.

In the case of areas of different measuring patterns which are to be irradiated in a different manner (for example by means of different opening angles 33 or by a different number of measuring lines in the measuring patterns) the photometric output can be varied particularly advantageously by means of the splitting ratios of the beam splitters in such a way that the measuring lines in all measuring patterns comprise the same intensity. There are also other methods known in the state of the art for splitting and deflection such as prisms or diffractive beam splitting methods. In the embodiment shown the incident beam is split into three outgoing beams; lesser or higher splits can also be realised using corresponding means known in the state of the art.

The split beams of the light source are incident on a spatial modulator 53, which for example is implemented as a liquid crystal display (LCD or LCoS). FIG. 6.2 shows a schematic representation of an advantageous spatial modulator 53, which contains several optically modulatable segments 54, wherein the number thereof at least corresponds to the number of incident light beams. As shown in FIG. 6.2 these optically modulatable segments 54 may be arranged on a single (one-piece) component, or may be formed from several separate components. A projection control system 51 switches (controls) the light emission of the light source 30 and the state of the spatial light modulator 53 for the respective beam path and thus the illumination of a respectively assigned DOE 31. The three DOEs 31 are implemented here as a one-piece, joint DOE substrate 31S with several separate diffractive structures 36, wherein it is also possible to use several single DOEs/substrates.

According to an advantageous implementation the light beam emitted by the light source may be substantially collimated (for example by means of a collective lens optics not shown), i.e. the emitted light beams comprise a minimised divergence. The collimated light beams are incident respectively onto a focusing optics arranged between beam splitter 50/mirror 52 and DOE 31, which focusses incident light beams onto the working plane A. A particularly advantageous optics is an optics which comprises an astigmatism, which focusses incident beams in direction of the Y axis, onto the working plane A, and in direction of the X axis, not onto to working plane A. As a result the projected measuring lines (which are oriented parallel to the X axis) are focused in the working plane A, the zero diffraction order of the DOEs however, due to the defocusing in the X axis does not appear as a point (spot) but as lines and thus is intensity-reduced. The reduction in intensity is advantageous in terms of laser safety and projection quality of the measuring patterns. The focusing optics, as shown in FIG. 6.1, can be advantageously implemented as a one-piece astigmatic optics 41 (for example a cylinder lens, the cylinder axis of which extends parallel to the X axis), however individual astigmatic optics or individual non-astigmatic optics are also possible. Equally, instead of focusing optics, light-focusingly effective DOEs can be used.

FIG. 7 shows representations of measuring patterns of an embodiment of an inventive intraoral scanner as well as the spatial orientation and symmetry thereof. The three measuring patterns 6 shown form an overall measuring pattern and comprise a plurality of measuring lines 6 respectively, which extend parallel to the X axis. FIG. 7a shows a first measuring pattern, FIG. 7b shows a second measuring pattern and FIG. 7c shows a third measuring pattern (of the three measuring patterns 9). Theoretically the measuring patterns 6 projected onto a surface 1 would then appear undistorted in this way, if they were observed from a recording axis R coinciding with the respective projection axis P (which is not the case in the present invention). The coordinate system shown here corresponds to the coordinate system of previous figures.

The measuring lines 9 are arranged on possible measuring line positions 9P. The possible measuring line positions 9P correspond to a grating with a constant measuring line period MP. A measuring line 9 shown on a possible measuring line position 9P is also called a displayed measuring line 9P_D. A possible measuring line position 9P on which no measuring line 9P_D is arranged is called a non-displayed measuring line 9P_ND. Displayed measuring lines 9P_D and non-displayed measuring lines 9P_ND which are assigned to a joint possible measuring line position 9P form a group G of measuring lines. The combination of displayed measuring lines 9P_D and non-displayed measuring lines 9P_ND within a group G corresponds to a symbol (assigned to the possible measuring line position 9P). For reasons of clarity, not all measuring lines 9 shown are marked with a respective reference symbol, marking being restricted to only selected measuring lines 9, possible measuring line positions 9P, displayed measuring lines 9P_D, non-displaced measuring lines 9P_ND/groups G.

The measuring patterns 6 are drawn point-symmetrically about a respective measuring pattern centre point 37 and can thus be generated by means of binary DOEs. In order to illustrate the symmetry a horizontal symmetry axis 62 and vertical symmetry axes 63 are plotted in FIG. 7. The measuring patterns 6 are preferably formed such that the measuring pattern centre point 37 and thus the zero diffraction order lies on the measuring line 9, respectively. If they were not lying on a measuring line, they would generate, depending on the embodiment, a point or a line in the middle of the measuring patterns, which would not be part of the desired pattern projection.

Figure 8:
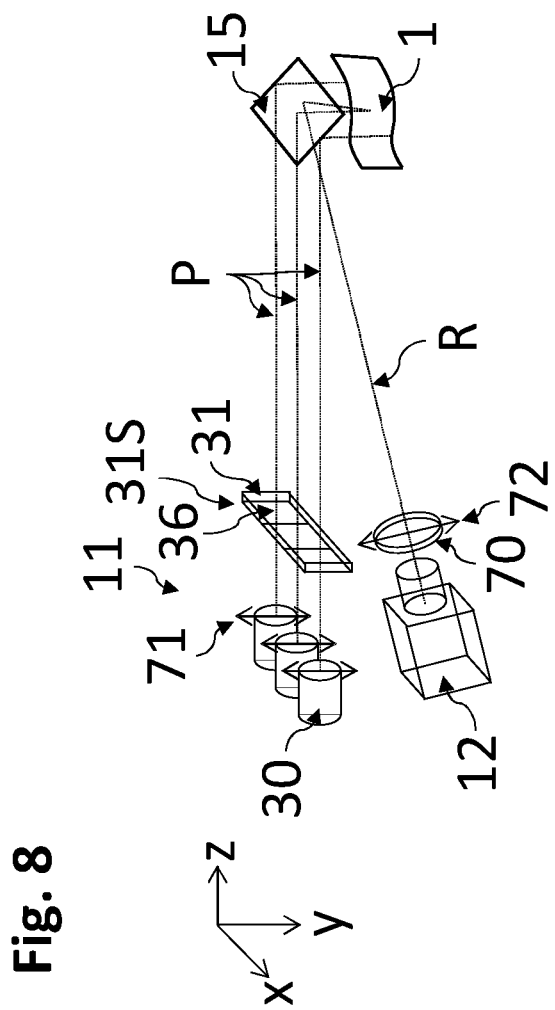

FIG. 8 shows a schematic representation of an exemplary embodiment of an inventive intraoral scanner comprising a projection system 11 and a recording system 12, a deflection mirror 15, and a transmissive linear polarisation filter 70 with a polarisation direction of recording according to arrow 72. The projection system 11 comprises three light sources 30 implemented as laser light sources with a natural polarisation direction of light emission according to arrows 71 of emitted light, and three diffractive optical elements (DOE) 31 implemented as a one-piece DOE substrate 31S with a diffractive structure (or diffractive area) 36, respectively. The light sources 30 illuminate sequentially or simultaneously the diffractive optical elements 31/diffraction structures 36 assigned to them and generate, by means of light diffraction, respective (stored there) measuring patterns 6 of a structured illumination. The measuring patterns 6 are reflected by the deflection mirror 15 onto a surface 1 (to be recorded) of an object. The recording system 12 records the measuring patterns 6 projected via the deflection mirror 15 onto the surface 1. The light sources 30 and the transmissive polarisation filter 70 are aligned to each other such that they comprise a common polarisation direction. Alignment of the light sources 30 is rotational about the respective projection axes P; alignment of the polarisation filter 70 is rotational about the recording axis R. In the case of laser light sources, in particular laser diodes the polarisation direction is usually correlated with housing features. Accordingly the assembly system of the light sources may be designed such that it can only be equipped in the correct polarisation direction. The thus assured common polarisation direction of the light sources is maintained during projection of the structured illumination by means of light diffraction, as well as during the double deflection (projection and recording) by means of the deflection mirror 15.

The common polarisation direction of the light sources 30 and the polarisation filter 70 shown in FIG. 8 is given as an example. The crucial point for an effective implementation consists in that the components comprise a common polarisation direction. The shown polarisation filter 70 is implemented as a transmissive polarisation filter.

What is claimed is:

1. A method for recording the topography of the surface (1) of a translucent, in particular dental, object (O) comprising the steps of:

recording a first partial topography of a first partial area (B.I) of the surface (1) and a second partial topography of the second partial area (B.II) of the surface (1) overlapping at least partially the first partial area (B.I), wherein the recording of the partial areas (B.I, B.II) of the surface (1) is performed, respectively, by by projecting an overall measuring pattern of the respective partial area (B.I, B.II) of the surface (1) of the translucent object (O) by means of a projection system (11), wherein the projection system (11) includes at least one light source (30) and at least two diffractive optical elements (31), the overall measuring pattern comprises at least two different measuring patterns, the measuring patterns (6) are projectable onto the surface (1) and respectively comprise a plurality of measuring lines (9) parallel to each other, the measuring patterns (6) each have one of the diffractive optical elements (31) assigned to them, by means of which the measuring lines (9) can be generated through light diffraction, the at least one light source (30) illuminates the diffractive optical elements (31) with light linearly polarised in a polarisation direction (71), and a polarisation filter (70) is arranged between the surface (1) and the recording system (12), the direction of passage (72) of which coincides with the polarisation direction (71), and providing a first image and a second image of the respective partial area ((B.I, B.II)) of the surface (1) by means of a recording system (12), wherein in the first image a first of the at least two measuring patterns (6) is projected onto the respective partial area (B.I, B.II) of the surface (1) and in the second image a second of the at least two measuring patterns (6) is projected onto the respective partial area (B.I, B.II) of the surface (1), and recording the respective topography of the respective partial area (B.I, B.II) of the surface (1) respectively by means of triangulation using the respective first image and/or the respective second image, recording the topography of the surface (1) by at least partially superimposing the first partial topography and the second partial topography of the surface (1).

2. The method of claim 1, wherein the polarisation filter (70) is polarisingly effective only in the emission spectrum of the at least one light source (30) and is neutral in the remaining emission spectrum.

3. The method of claim 1, wherein projecting the overall measuring pattern onto the respective partial area (B.I, B.II) of the surface (1) of the translucent object (O) includes:

reducing speckle by means of at least one device for reducing speckle (V3) by optionally moving at least one of the diffractive optical elements (31) in a translatory manner while projecting the overall measuring pattern.

4. The method of claim 1, wherein the measuring lines (9) are calibrated by means of algebraic surfaces and triangulation is performed optionally using these algebraic surfaces.

5. The method of claim 1, wherein the method further includes:

generating an unstructured illumination on the surface (1) of the object (O) with uniformly distributed intensity by means of an illumination device (B), wherein optionally the unstructured illumination includes red, green, blue, white, ultraviolet, near-infrared or infrared light or a combination thereof.

6. The method of claim 1, wherein the first measuring pattern (6) is projected in a first wavelength spectrum and the second measuring pattern (6) is projected in a second wavelength spectrum, in particular simultaneously, and the recording system (12) is arranged spectrally selectively such that the first image is provided by means of predominantly recording light of the first wavelength spectrum and the second image is recorded by means of predominantly recording light of the second wavelength spectrum.

7. The method of claim 1, wherein the first measuring pattern (6) is projected in a first polarisation state or in a first polarisation direction and the second measuring pattern (6) is projected in a second polarisation state or in a second polarisation direction, in particular simultaneously, and the recording system (12) is arranged polarisation-selectively or polarisation-sensitively such that the first image is provided by means of predominantly recording light of the first polarisation direction or the first polarisation state and the second image is provided by means of predominantly recording light of the second polarisation direction or the second polarisation state.

8. An intraoral scanner (100) for recording the topography of the surface (1) of a translucent, in particular dental, object (O) in the method of claim 1, including a projection system (11), a recording system (12) and a computer system (121) operatively connected to the projection system (11) and the recording system (12), wherein the projection system (11) includes at least one light source (30) and at least two diffractive optical elements (31) and is arranged to project an overall measuring pattern onto partial areas (B.I, B.II) of the surface (1) of the translucent object (O), the overall measuring pattern comprises at least two different measuring patterns (6), the measuring patterns (6) are each projectable onto the surface (1) and each comprise a plurality of measuring lines (9) parallel to each other, the measuring patterns (6) each have one of the diffractive optical elements (31) assigned to them, by means of which the measuring lines (9) can be generated by light diffraction, and the at least one light source (30) illuminates the diffractive optical elements (31) with light linearly polarised in a polarisation direction (71), and the recording system (12) has a linear polarisation filter (70) assigned to it between the surface (1) and the recording system (12), the direction of diffraction (72) of which coincides with the polarisation direction (71), wherein the recording system (12) is arranged to provide a first image and a second image of the respective partial area (B.I, B.II) of the surface (1), and in the first image a first of the at least two measuring patterns (6) is projected onto the respective partial area (B.I, B.II) of the surface (1), and in the second image a second of the at least two measuring patterns (6) is projected onto the respective partial area (B.I, B.II) of the surface (1), wherein the computer system (121) is arranged to record a first partial topography of the first partial area (B.I) of the surface (1) and the second partial topography of the second partial area (B.II) of the surface (1) by means of triangulation respectively, using the respective first image and/or the respective second image, and to record the topography of the surface (1) by at least partially superimposing the first partial topography and the second partial topography of the surface (1).

9. The intraoral scanner (100) of claim 8, wherein the diffractive optical elements (31) are arranged on a common substrate (31S), wherein in particular the diffraction structures (36) of the diffractive optical elements (31) are arranged in a common plane.

10. The intraoral scanner (100) of claim 8, wherein at least one of the measuring patterns (6) is formed point-symmetrically relative to a measuring pattern centre (37) and the associated diffractive optical element (31) is optionally realised as a binary diffractive optical element.

11. The intraoral scanner (100) of claim 8, wherein the measuring patterns (6) can each be projected in direction of a projection axis (P) onto the surface (1) and the projection axes (P) are arranged in a common projection axis plane, which is parallel to the direction of the measuring lines (9), and in that optionally at least one measuring pattern centre (37) of a measuring pattern (6) is arranged in a common projection axis plane.

12. The intraoral scanner (100) of claim 8, wherein the projection system (11) includes a first device for the adjustment (V1) of a position of at least one projection axis (P) and/or a second device for adjustment (V2), wherein by means of the second device for adjustment (V2)

- a distance between one of the diffractive optical elements (31) and the at least one light source (30) can be changed or
- a distance between a lens and the at least one light source (30) can be changed.

13. The intraoral scanner (100) of claim 8, wherein projection of the measuring patterns (6) is performed at different opening angles (33).

14. The intraoral scanner (100) of claim 8, wherein the projection system (11) includes a device for reducing speckle (V3) and optionally at least one of the diffractive optical elements (31) is movable, in particular translatorily, during projection of the overall measuring pattern.

15. The intraoral scanner (100) of claim 8, wherein the projection system (11) includes at least one astigmatic lens.

16. The intraoral scanner (100) of claim 8, wherein at least one of the diffractive optical elements (31) is effective in a light-focusing manner.

17. The intraoral scanner (100) of claim 8, wherein the projection system (11) includes at least one beam splitter (50) and at least one spatial light modulator (53).

18. The intraoral scanner (100) of claim 8, wherein the projection system (11) includes an illumination device (B) for generating an unstructured illumination on the surface (1) of the object (O) with uniformly distributed intensity and the unstructured illumination optionally includes red, green, blue, white, ultraviolet, near-infrared or infrared light or a combination thereof.

19. The intraoral scanner (100) of claim 8, wherein the at least one light source (30) is implemented as a laser light source,

- and that in a first dimension the laser light source is single-mode and in a second dimension is multi-mode, wherein the second dimension is oriented parallel to or vertically to the direction of the measuring lines (9),
- and/or at least one operating parameter of the laser light source is controlled and/or the at least one operating parameter can be modulated at a frequency in the range from 1-1000 MHz.

* * * * *